(12) United States Patent
Yang et al.

(10) Patent No.: US 12,068,450 B2
(45) Date of Patent: Aug. 20, 2024

(54) METHOD FOR FABRICATING GALLIUM-DOPED LITHIUM LANTHANUM ZIRCONIUM OXIDE, AND ALL-SOLID-STATE BATTERY INCLUDING THE SAME

(71) Applicant: MING CHI UNIVERSITY OF TECHNOLOGY, New Taipei (TW)

(72) Inventors: Chun-Chen Yang, New Taipei (TW); Yi-Shiuan Wu, New Taipei (TW); Kumlachew Zelalem Walle, New Taipei (TW)

(73) Assignee: MING CHI UNIVERSITY OF TECHNOLOGY, New Taipei (TW)

( * ) Notice: Subject to any disclaimer, the term of this patent is extended or adjusted under 35 U.S.C. 154(b) by 0 days.

(21) Appl. No.: 18/231,883

(22) Filed: Aug. 9, 2023

(65) Prior Publication Data
US 2023/0387452 A1 Nov. 30, 2023

Related U.S. Application Data

(63) Continuation-in-part of application No. 17/383,799, filed on Jul. 23, 2021, now Pat. No. 11,799,170.

(51) Int. Cl.
*H01M 10/056* (2010.01)
*H01M 4/02* (2006.01)
*H01M 4/38* (2006.01)

(52) U.S. Cl.
CPC ......... *H01M 10/056* (2013.01); *H01M 4/382* (2013.01); *H01M 2004/027* (2013.01)

(58) Field of Classification Search
CPC . H01M 50/446; H01M 50/403; H01M 50/451
(Continued)

(56) References Cited

U.S. PATENT DOCUMENTS

2019/0036159 A1\* 1/2019 Kim ..................... H01M 4/525

FOREIGN PATENT DOCUMENTS

| CN | 108695547 A | \* | 10/2018 | ........ H01M 10/0525 |
| CN | 108832173 A | \* | 11/2018 | ........ H01M 10/0525 |

(Continued)

*Primary Examiner* — Sean P Cullen
(74) *Attorney, Agent, or Firm* — Amster, Rothstein & Ebenstein LLP

(57) ABSTRACT

The present invention provides a method for the fabrication of a $LaZrGa(OH)_x$ metal hydroxide precursor with a co-precipitation method in a continuous TFR. The present invention also provides a method for the fabrication of an ion-doped all-solid-state lithium-ion conductive material with lithium ionic conductivity, and mixing with the polymer-based material, then using a doctor-blade coating method to prepare free-standing double- or triple-layered organic-inorganic hybrid solid electrolyte membranes. Furthermore, the present invention provides an all-solid-state lithium battery using the aforementioned hybrid solid electrolyte membrane and the electrochemical performance of the all-solid-state lithium battery. The all-solid-state lithium battery may enhance the lithium ionic conductivity and lower the interfacial resistance between the hybrid solid electrolyte membrane and the electrodes, therefore the battery may have excellent performance, and prevent the lithium-dendrite formation effectively to enhance the battery safety.

13 Claims, 20 Drawing Sheets

(58) Field of Classification Search
USPC .................................. 429/188, 304, 305, 322
See application file for complete search history.

(56) References Cited

FOREIGN PATENT DOCUMENTS

| | | | |
|---|---|---|---|
| CN | 109802173 A | * | 5/2019 |
| CN | 111430788 A | * | 7/2020 |

* cited by examiner

Volume Statistics (Arithmetic)    Ga-F-LLZO 140HR_G_16.$ls

Calculations from 0.040 um to 2000 um

Volume: 100%
Mean: 0.382 um            S.D.:       0.422 um
Median: 0.213 um
Mode: 0.155 um $d_{10}$: 0.089 um        $d_{50}$: 0.213 um        $d_{90}$: 0.956 um

| <10% | <25% | <50% | <75% | <90% |
|---|---|---|---|---|
| 0.089 um | 0.127 um | 0.213 um | 0.442 um | 0.956 um |

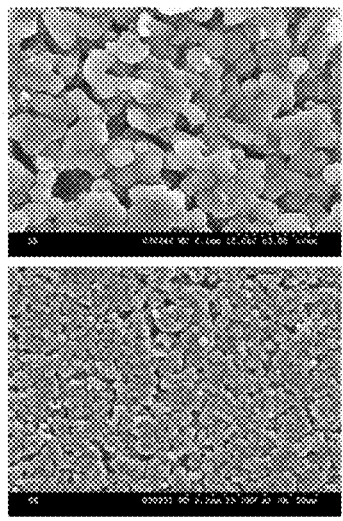
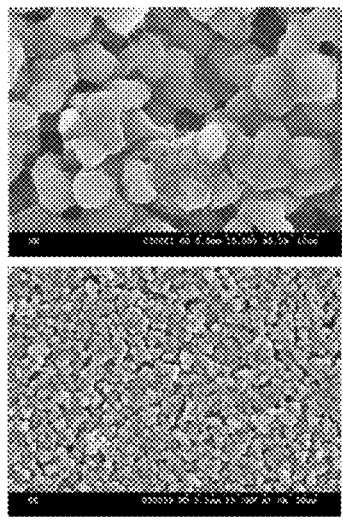
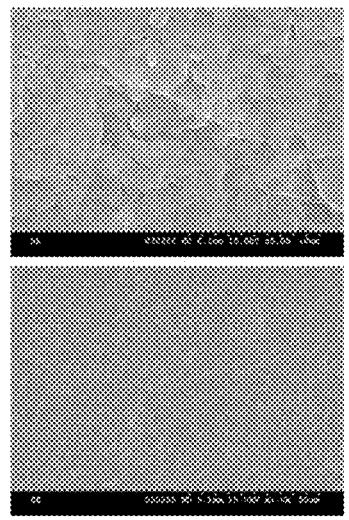
FIG. 11A  FIG. 11B  FIG. 11C
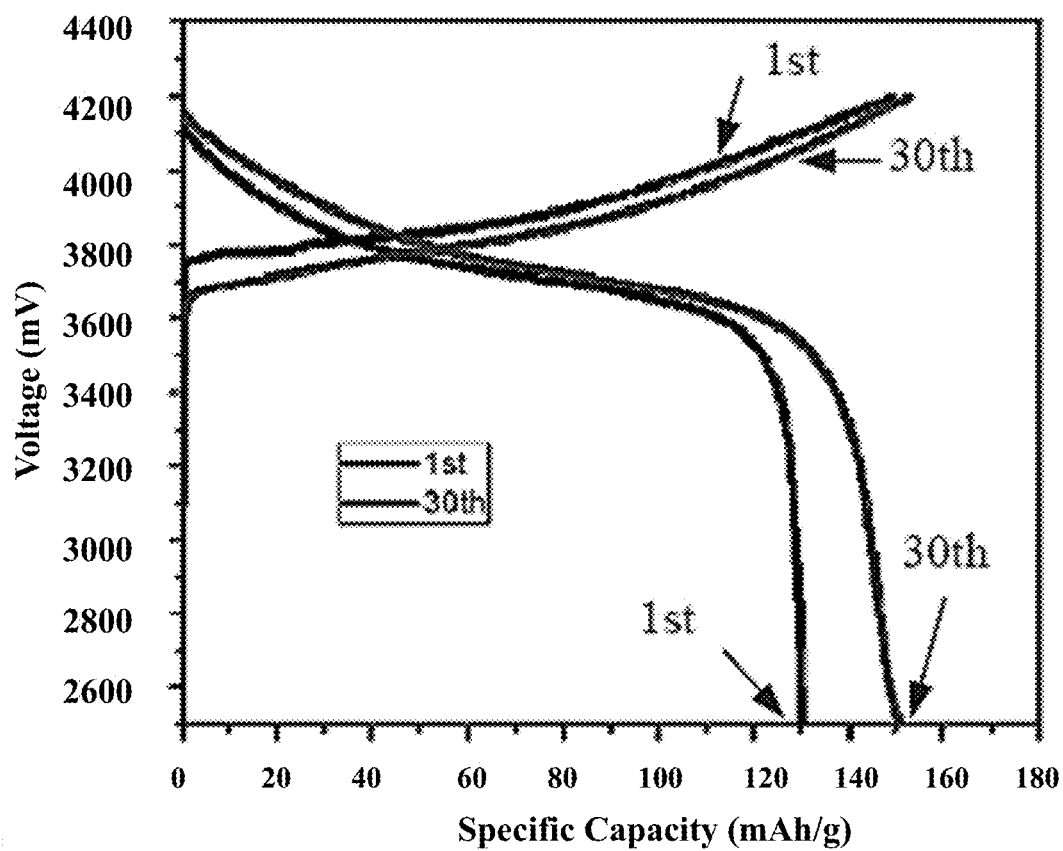
FIG. 12A

METHOD FOR FABRICATING GALLIUM-DOPED LITHIUM LANTHANUM ZIRCONIUM OXIDE, AND ALL-SOLID-STATE BATTERY INCLUDING THE SAME

CROSS REFERENCE TO RELATED APPLICATIONS

The present application claims priority to Taiwan Patent Application No. 109126389 filed Aug. 4, 2020 and entitled "A METHOD FOR THE FABRICATION OF A HYBRID SOLID ELECTROLYTE MEMBRANE, AND AN ALL-SOLID-STATE LITHIUM BATTERY USES THE MEMBRANE," which is hereby incorporated by reference in its entirety.

FIELD OF THE INVENTION

This invention relates to a method for the fabrication of a LaZrGa(OH)$_x$ metal hydroxide precursor, the fabrication of an ion-doped all-solid-state lithium-ion conductive material with lithium ionic conductivity using the precursor, and the fabrication of a free-standing double-layered triple-layered organic-inorganic hybrid solid electrolyte (hereinafter called "HSE") membrane using the all-solid-state lithium-ion conductive material. The hybrid solid electrolyte membrane is further utilized in an all-solid-state lithium battery.

BACKGROUND OF THE INVENTION

Lithium-ion batteries are often used for electrical storage or powered devices, such as consumer electronics and transportation facilities, due to the high open circuit voltage, high energy density, fast charge-discharge rate, long lifetime of charge-discharge cycle, low self-discharge and lightweight. However, volatile and flammable liquid electrolytes may highly affect the safety of lithium-ion batteries. After undergoing several charge-discharge cycles, other than the risk of overheating, combustion and even explosion, the problem of internal short circuit of batteries due to the acicular lithium-dendrite formation may also arise easily.

Though an all-solid-state lithium battery using a solid electrolyte membrane may effectively prevent safety problems such as electrolyte leakage and combustion or explosion, other problems, including the lithium-dendrite formation, the high interfacial resistance due to the poor contact between the solid electrolyte membrane and the electrodes, and the generally low conductivity (around $10^{-7}$ S cm$^{-1}$) at room temperature (25° C.), still exist, which lead to a bad overall battery performance.

Therefore, regarding the current lithium batteries, the technology of preventing the lithium-dendrite formation, enhancing the lithium ionic conductivity, and lowering the interfacial resistance between the solid electrolyte membrane and the electrodes, in order to higher the battery performance, still needs to be improved.

PRIOR ART LITERATURE

Patent Literature

[Patent Literature 1] TW202014382

SUMMARY OF THE INVENTION

The performance of the current lithium batteries is limited due to the problems such as the lithium-dendrite formation, low lithium ionic conductivity and high interfacial resistance resulting from the poor contact between the solid electrolyte membrane and the electrodes.

In order to solve such problems, the inventor of the present invention, after thorough research, provides a method for the fabrication of a LaZrGa(OH)$_x$ metal hydroxide precursor, the fabrication of an ion-doped all-solid-state lithium-ion conductive material with lithium ionic conductivity, and the fabrication of a free-standing double-layered and triple-layered organic-inorganic (polymer comprising ceramics) hybrid solid electrolyte membrane using the all-solid-state lithium-ion conductive material.

That is, as a first aspect, the present invention relates to a method for the fabrication of a LaZrGa(OH)$_x$ metal hydroxide precursor, comprising the steps of:

(a) Dissolving the metal salt powders, which separately serve as a lanthanum source, a zirconium source and a gallium source, in deionized water to form a metal salt solution 1; the said metal salt powders may be adjusted according to the corresponding stoichiometric composition during the synthesis;

(b) Adding sodium hydroxide to create an alkaline region and as precipitation agent solution, ammonia water, which serves as a chelating agent, and the metal salt solution 1 prepared by said step (a) into the reaction chamber of a continuous Taylor flow reactor (hereinafter called TFR), maintaining the pH value the reaction chamber by a pH value control system, to conduct a continuous production with a co-precipitation method: the dose of the said precipitation agent and the said chelating agent may be properly adjusted according to the stoichiometric composition of different hydroxide precursors;

(c) After the reaction, filtering the precipitate prepared by step (b) and washing the precipitate several times with ethanol and deionized water, in order to remove the residual ions (Na$^+$, NO$_3^-$ and other ions);

(d) Drying the filtered and washed precipitate prepared by said step (c) in an oven; the LaZrGa(OH)$_x$ metal hydroxide precursor powder is therefore prepared.

As a second aspect, the present invention relates to a method for the fabrication of an ion-doped all-solid-state lithium-ion conductive material with lithium ionic conductivity, comprising the steps of:

(a) Mixing the LaZrGa(OH)$_x$ metal hydroxide precursor powders set forth the first aspect, lithium salts, which serve as a lithium source, and a source of ion doping, to form a mixture; in a milling pot containing methanol solvent, grinding and mixing the mixture with the ball mill to form a mixture solution; after grinding, taking out the milling ball from the milling pot, and placing the milling pot in an oven to dry the mixture solution, in order to remove the methanol solvent and to form the powders;

(b) Calcining the dried powders prepared in said step (a) in air or pure oxygen atmosphere in a furnace; the all-solid-state lithium-ion conductive material powders are therefore prepared:

wherein the ion doping in said step (a) is by one or more doping methods selected from single-ion doping, dual-ion doping and multi-ion doping:

wherein the source of ion doping in said step (a) is one or more ions selected from fluoride ion, gallium ion, aluminum ion, calcium ion, tantalum ion, strontium ion, scandium ion, barium ion, yttrium ion, tungsten ion, niobium ion, gadolinium ion and silicon ion.

As a third aspect, the present invention relates to a method for the fabrication of a free-standing double-layered organic-inorganic hybrid solid electrolyte membrane, comprising the steps of
(a) Dissolving polyvinylidene fluoride (PVDF) in dimethylformamide (DMF) solvent, adding lithium salt, mixing and stirring to prepare homogeneous solution A; adding polyacrylonitrile (PAN), plasticizer and the all-solid-state lithium-ion conductive material prepared by the method for the fabrication of an ion-doped all-solid-state lithium-ion conductive material set forth in said second aspect into said homogeneous solution A, which is then stirred and mixed, and coated on a glass substrate; placing the glass substrate in a vacuum oven at room temperature to dry and remove part of the DMF solvent; the first layer of the membrane is therefore formed;
(b) According to said step (a), lowering the proportion of the lithium salts to PVDF and PAN (namely lithium salts: PVDF and PAN) and the proportion of said all-solid-state lithium-ion conductive material to PVDF and PAN, to prepare solution B; coating the solution B on the first layer of the membrane in said step (a), to prepare the second layer of the membrane; placing the double-layered hybrid solid electrolyte membrane in a vacuum oven to dry and remove the residual solvent; cutting the prepared membrane into circular to serve as the electrolyte membrane used in subsequent cell assembly process;
wherein the proportion of the lithium salts to PVDF and PAN may be 33.3%~100% of the amount added in said step (a);
wherein the proportion of said all-solid-state lithium-ion conductive material to PVDF and PAN may be 25%~150% of the amount added in said step (a).

As a fourth aspect, the present invention relates to a method for the fabrication of a free-standing triple-layered organic-inorganic hybrid solid electrolyte membrane, comprising the steps of:
(a) Dissolving PVDF in DMF solvent, adding lithium salts, mixing and stirring to prepare homogeneous solution A; adding PAN, plasticizer and a carbon-based material coated with a coating material into said homogeneous solution A, which is then stirred and mixed, and coated on a glass substrate; placing the glass substrate in a vacuum oven at room temperature to dry and remove part of the solvent; the first layer of the membrane is therefore formed;
(b) Dissolving PVDF in DMF solvent, adding lithium salts, mixing and stirring to prepare homogeneous solution A; adding PAN, plasticizer and the all-solid-state lithium-ion conductive material prepared by the method for the fabrication of an ion-doped all-solid-state lithium-ion conductive material set forth in said second aspect into said homogeneous solution A, which is then stirred to prepare solution B; coating said solution B on said first layer of the membrane prepared in said step (a) to form the second layer;
(c) According to said step (b), lowering the proportion of the all-solid-state lithium-ion conductive material coated with the coating material to PVDF and PAN, to prepare solution C; coating said solution C on said second layer of the membrane; placing the triple-layered hybrid solid electrolyte membrane in a vacuum oven to dry and remove the residual solvent; cutting the prepared membrane into circular to serve as the electrolyte membrane used in subsequent cell assembly process;
wherein the carbon-based material used in said step (a) is one or more materials selected from single-wall carbon nanotube, multiwall carbon nanotube, vapor-grown carbon fiber, graphene oxide, reduced graphene oxide, graphene, graphitic carbon nitride ($g-C_3N_4$) and porous carbon, etc.; the coating material used in said step (a) and (b) is one or more materials selected from lithiated sulfonated tetrafluoroethylene based fluoropolymer-copolymer (Li-NAFION®), lithiated polystyrene sulfonate (Li-PSS), lithium fluoride (LiF), lithiated polyacrylic acid (Li-PAA), lithium molybdate ($Li_2MoO_4$), lithium orthosilicate ($Li_4SiO_4$) and porous carbon;
wherein the proportion of said all-solid-state lithium-ion conductive material coated with the coating material to PVDF and PAN may be 25%-150% of the amount added in said step (b).

A fifth aspect of the present invention relates to the method for the fabrication of a $LaZrGa(OH)_x$ metal hydroxide precursor material recited in the first aspect, wherein the lanthanum source in said step (a) is one or more materials selected from lanthanum sulfate, lanthanum oxalate, lanthanum acetate, lanthanum nitrate, lanthanum chloride, lanthanum fluoride, lanthanum hydroxide.

A sixth aspect of the present invention relates to the method for the fabrication of a $LaZrGa(OH)_x$ metal hydroxide precursor material recited in the first aspect, wherein the zirconium source in said step (a) is one or more materials selected from zirconium oxychloride, zirconium sulphate, zirconium phosphate, zirconium carbonate, zirconium acetate, zirconium oxynitrate, zirconium chloride, zirconium dioxide and zirconium hydroxide.

A seventh aspect of the present invention relates to the method for the fabrication of a $LaZrGa(OH)_x$ metal hydroxide precursor material recited in the first aspect, wherein the gallium source in said step (a) is one or more materials selected from gallium oxalate, gallium acetate, gallium carbonate, gallium hydroxide, gallium sulfate, gallium nitrate, gallium phosphate and gallium oxide.

An eighth aspect of the present invention relates to the method for the fabrication of a $LaZrGa(OH)_x$ metal hydroxide precursor material recited in the first aspect, wherein the concentration of the metal salt solution 1 in said step (a) is 1.0~3 M, preferably 2.0 M; wherein in said step (a), the stoichiometric composition of $La(NO_3)_3 \cdot 6H_2O$, serving as a lanthanum source, $ZrOCl_2 \cdot 8H_2O$, serving as a zirconium source, and $Ga(NO_3)_3$, serving as a gallium source, is 3:2:0.05~0.5.

A ninth aspect of the present invention relates to the method for the fabrication of a $LaZrGa(OH)_x$ metal hydroxide precursor material recited in the first aspect, wherein in said step (b), the concentration of the ammonia water, which serves as a chelating agent, is 2.0~8.0 M, preferably 3.6 M; said pH value in said reaction chamber of the TFR is controlled between 10~12, preferably around 11; the rotation rate of said TFR is set within the range of 500~1500 rpm, preferably 1300 rpm; the reaction time in said TFR is 8~80 hours, preferably 12~16 hours.

A tenth aspect of the present invention relates to the method for the fabrication of a $LaZrGa(OH)_x$ metal hydroxide precursor material recited in the first aspect, wherein the drying condition in said step (d) is at 50~100° C. (preferably 80° C.) for 10~30 hours, preferably 24 hours.

An eleventh aspect of the present invention relates to the method for the fabrication of an ion-doped all-solid-state lithium-ion conductive material recited in the second aspect, wherein the lithium source in said step (a) is one or more materials selected from lithium hydroxide, lithium nitrate, lithium acetate, lithium oxalate, lithium oxide, lithium chloride, lithium hydrogen phosphate, lithium phosphate and lithium carbonate; the molar ratio between the LaZrGa(OH)$_x$ metal hydroxide precursor and the lithium salt in said step (a) is 1:5. 5~6. 650 (i.e. 5~20% excess amount of the lithium salt), preferably 1:6 (i.e. 10% excess amount of the lithium salt); using lithium fluoride (LiF) or ammonium fluoride (NH$_4$F) as the source of ion doping with the stoichiometric composition 0.05~0.3 (preferably 0.2); the condition of grinding and mixing in the ball mill in said step (a) is 100~650 rpm for 10 minutes to 2 hours, preferably 400 rpm/20 min, and the ball of the ball mill is one or more selected from zirconia (ZrO$_2$) ball, hardened steel, yttrium stabilized zirconia (YSZ), stainless steel, tungsten carbide, agate, sintered alumina and silicon nitride ball, wherein the weight ratio of the mixture to the ball in said step (a) is 1:1~20, preferably 1:10.

A twelfth aspect of the present invention relates to the method for the fabrication of an ion-doped all-solid-state lithium-ion conductive material recited in the second aspect, wherein the condition of the calcination in said step (b) is: keeping the temperature at 150° C. for 1 hour in a first stage, 300~400° C. (preferably 350° C.) for 3 hours in a second stage, 400~600° C. (preferably 550° C.) for 1 hour in a third stage, 500~800° C. (750° C.) for 4 hours in a fourth stage, and 800~1000° C. (preferably 900° C.) for 1~5 hours (preferably 2 hours) in a fifth stage. The heating rate of said five stages is 1~10° C. min$^{-1}$, preferably 3° C. min$^{-1}$.

A thirteenth aspect of the present invention relates to the method for the fabrication of a double-layered hybrid solid electrolyte membrane recited in the third aspect, wherein the lithium salt in said step (a) is one or more materials selected from lithium bis(trifluoromethanesulfonyl)imide, lithium bis(trifluoromethanesulfonyl)azanide, lithium bis(fluorosulfonyl)imide, lithium perchlorate, lithium trifluoromethanesulfonate, lithium bis(oxalate)borate and lithium tetrafluoroborate; the plasticizer in said step (a) is one or more materials selected from succinonitrile, adiponitrile, lithium azide, polyethylene glycol, poly(ethylene glycol) diacrylate and triallyl isocyanurate.

A fourteenth aspect of the present invention relates to the method for the fabrication of a triple-layered hybrid solid electrolyte membrane recited in the fourth aspect, wherein in the process of material surface coating, the amount of coating in said step (a) and (b) is 0.05~5.0 wt. %, preferably 0.5~1.5 wt. %.

The present invention is also to provide an all-solid-state lithium battery with excellent performance, using said hybrid solid electrolyte membrane.

That is, as the fifteenth aspect, the present invention relates to an all-solid-state lithium battery, comprising: a cathode, an anode, and the hybrid solid electrolyte membrane recited in the third or the fourth aspect; wherein said hybrid solid electrolyte membrane is disposed between the cathode and the anode, serving as a separator and electrolyte at the same time; said anode is lithium metal foil; said cathode is made of a composite comprising active material, conductive agent and binder on a current collector (i.e., aluminum foil or carbon-coated aluminum foil).

The triple-layered HSE membrane of the present invention utilizes a multiwall carbon nanotube carbon-based material coated with Li-NAFION® coating material (i.e. Li-NAFION®@MWCNT), and ion-doped Ga—F-LLZO all-solid-state lithium-ion conductive material coated with Li-NAFION® coating material (i.e. Li-NAFION®@Ga—F-LLZO), to increase the conducting pathways of the lithium ions and inhibit the lithium-dendrite formation.

The present invention also measures and analyzes the lithium ionic conductivity, electrochemical stability and interfacial resistance behavior, etc. of the prepared double- and triple-layered HSE membrane. The ionic conductivity of the Ga—F-LLZO all-solid-state lithium-ion conductive pellet at room temperature is $2.50 \times 10^{-4}$ S cm$^{-1}$. The ionic conductivities of the double-layered and triple-layered HSE membranes at room temperature are $2.67 \times 10^{-4}$ S cm$^{-1}$ and $4.45 \times 10^{-4}$ S cm$^{-1}$, respectively.

The all-solid-state lithium battery of the present invention may enhance the lithium ionic conductivity with increased lithium-ion transport pathways, and lower the interfacial resistance between the hybrid solid electrolyte membrane and the electrodes, therefore the battery may have excellent performance, and prevent the lithium-dendrite formation to enhance the battery safety.

BRIEF DESCRIPTION OF THE DRAWINGS

FIG. 11A shows the SEM images of the top (air side) of the triple-layered HSE membrane, FIG. 11B shows the SEM images of the middle (sandwiched layer) of the triple-layered HSE membrane, and FIG. 11C shows the SEM images of the bottom (glass side) of the triple-layered HSE membrane.

FIG. 12A shows the charge-discharge curve of the all-solid-state NCM523/Bi-HSE/Li battery.

DETAILED DESCRIPTION OF THE INVENTION

Figure 1:
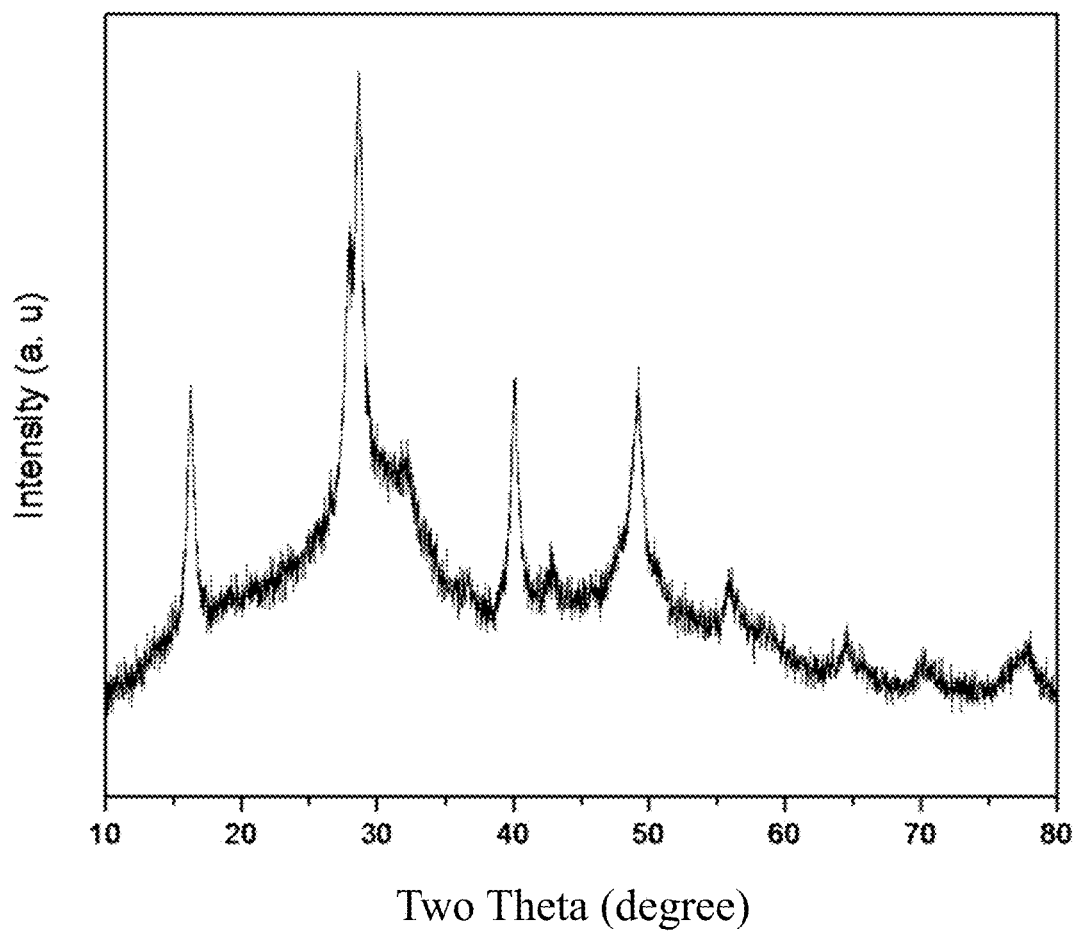
FIG. 1 shows the XRD pattern of the LaZrGa(OH)$_x$ metal hydroxide precursor powders.

The following examples are given to describe the method for the fabrication of the $LaZrGa(OH)_x$ metal hydroxide precursor, the all-solid-state lithium-ion conductive material, the hybrid solid electrolyte membrane, and the performance of the all-solid-state lithium battery using said hybrid solid electrolyte membrane. It should be noted that the following examples are only given for illustrative purposes and are not intended to limit the scope of the present invention.

Example 1

Preparing the $La_3Zr_2Ga_{0.3}(OH)_x$ hydroxide precursor, x=17.9: Compared with a Batch reactor, a stronger mixing capability may be achieved by a TFR due to the flowing theory of the Taylor flow, which may be about 7 times higher than the mixing capability of a Batch reactor. Therefore, the smaller particle size distribution (about ½ of which is achieved by a Batch reactor), pure cubic phase of the hydroxide precursor and a higher yield (volume of the reactor: 1~300 L) may be achieved in shorter reaction time (about ⅛ of the reaction time; increased mass transfer rate: 3.3 vs. 1.0 m s$^{-1}$). As a result, the present invention prepares the $La_3Zr_2Ga_{0.3}(OH)_{17.9}$ metal hydroxide precursor with a TFR.

One embodiment of preparing the $LaZrGa(OH)_x$ metal hydroxide precursor is as follow:
First, weigh metal salt powders to prepare the 2M metal salt solution of $La(NO_3)_3 \cdot 6H_2O$, $ZrOCl_2 \cdot 8H_2O$ and $Ga(NO_3)_3$ with the stoichiometric composition being 3:2:0.3, which may be adjusted in different preparation, and dissolve which in 1 L deionized water for 4 hours. At the same time, prepare 4M sodium hydroxide (NaOH) precipitant solution for equimolar reaction. Prepare 3.6M of ammonia water ($NH_4OH$) as a chelating agent for co-precipitation to prepare $La_3Zr_2Ga_{0.3}(OH)_{17.9}$. During the co-precipitation reaction in the TFR (LCTR-tera 3100, the volume of the reactor: 0.5~1.5 L), adjust and control the pH value in the reaction chamber at 11, the rotation rate of the reactor at 1300 rpm, the feed rate at 1.7 ml min$^{-1}$, and the reaction time within 12~16 hours at 25° C. The TFR, having a working volume of 1 L, comprises two coaxial cylinders. Two steel cylinders are both disposed of with heating jackets to control the reaction temperature. Spin the inner cylinder and keep the outer cylinder stationary to have a Taylor vortex flow within the gap between the inner cylinder and the outer cylinder. Finally, continuously collect the suspension of the $La_3Zr_2Ga_{0.3}(OH)_{17.9}$ metal hydroxide precursor sample at the nozzle end of the cylinder of the reactor. Filter the sample with filter paper and wash the sample several times with ethanol and deionized water to remove the residual ions ($Na^+$, $NO^{3-}$ and other ions). Dry the sample in an oven at 80° C. for 24 hours. The $La_3Zr_2Ga_{0.3}(OH)_{17.9}$ metal hydroxide precursor powders are therefore prepared.

Example 2

Preparing the ion-doped Ga—F-LLZO (i.e. $Li_{5.9}Ga_{0.3}La_3Zr_2F_{0.2}O_{11.8}$) all-solid-state lithium-ion conductive material:

The steps to prepare the ion-doped Ga—F-LLZO all-solid-state lithium-ion conductive material with fluorine doping (stoichiometry being 0.2, using LiF as the source of ion doping) are stated as follow. Place the dried $La_3Zr_2Ga_{0.3}(OH)_{17.9}$ metal hydroxide precursor prepared in Example 1, 10% excess of $LiOH \cdot H_2O$ (i.e. the molar ratio between $La_3Zr_2Ga_{0.3}(OH)_{17.9}$ and $LiOH \cdot H_2O$ is 1:6, in order to compensate the loss of lithium at high temperature due to the subsequent calcination), and LiF in a milling pot containing 99% methanol solvent (a zirconia ball is used, wherein the weight ratio between the mixture and the ball is 1:10), and grind and mix the mixture with a planetary ball mill (Planetary Ball Mill PM 200, Retsch, Germany) at 400 rpm for 20 minutes. After grinding, take out the milling ball from the milling pot, and place the milling pot in an oven, where the temperature is 80° C., to dry the mixture for 5~10 hours in order to remove the methanol solvent and produce the powder. Finally, calcine the dried powder in a furnace in an air atmosphere. The Ga—F-LLZO all-solid-state lithium-ion conductive material is produced. The calcination condition is shown in Table 1.

TABLE 1

| Step | Temperature (° C.) | Heating time (hour) | Heating rate (° C. min$^{-1}$) |
|---|---|---|---|
| 1 | 150 | 1 | 3 |
| 2 | 350 | 3 | 3 |
| 3 | 550 | 1 | 3 |
| 4 | 750 | 4 | 3 |
| 5 | 900 | 2 | 3 |

Example 3

Preparing the free-standing double-layered hybrid solid electrolyte (Bi-HSE) membrane:
One embodiment to prepare the free standing double-layered hybrid solid electrolyte membrane, i.e. double-layered Ga—F-LLZO@PVDF+PAN/LiTFSI/SN//Ga—F-LLZO@PVDF+PAN/LiTFSI/SN membrane, is shown as follow (in the present invention, different materials contained in the same layer of a membrane are separated with a "/", different layers of the membranes are separated with a "//", and the arrangement from top to bottom is shown as "the first layer//the second layer//the third layer):

The free-standing double-layered hybrid solid electrolyte membrane with lithium ionic conductivity is composed of polyvinylidene fluoride (PVDF) polymer, polyacrylonitrile (PAN) polymer, bis(trifluoromethanesulfonyl) imide (LiTFSI) lithium salt, succinonitrile (SN) plasticizer and ion-doped Ga—F-LLZO all-solid-state lithium-ion conductive material prepared in Example 2. Prepare the following two solutions, solution A and solution B, during the preparation of the membrane.

Step (1) solution A: Dissolve PVDF in dimethylformamide (DMF) solvent, add LiTFSI (the ratio of LiTFSI to PVDF and PAN is 1:1, wt. %), mix and stir at 65° C. for 4 hours to prepare a homogeneous solution (solution A). Add PAN (PAN:PVDF=1:9, wt. %), SN (SN: PVDF and PAN=1:9, wt. %) and ion-doped Ga—F-LLZO all-solid-state lithium-ion conductive material (Ga—F-LLZO: PVDF and PAN=0.2:1, wt. %) into the homogeneous solution A, and stir the solution at 65° C. for 6 hours. Subsequently, coat the mixture solution with the doctor-blade coating method on a glass substrate (i.e. the first layer, the glass side). Place the glass substrate in a vacuum oven at room temperature to dry and remove part of the DMF solvent.

Step (2) solution B: The preparation of solution B is similar to Step (1), but lower the ratio of LiTFSI to PVDF and PAN polymer to 1:2 (wt. %), and the ratio of Ga—F-LLZO to PVDF and PAN to 0.125:1 (wt. %). Coat solution B on the first layer, which is formed by solution A dried at room temperature, to form a second layer (i.e. the air side). Subsequently, dry the layer at 60° C. for 48 hours. Put the double-layered hybrid solid electrolyte membrane in a vacuum oven, and further dry it at 70° C. for 24 hours to remove the residual solvent.

The thickness of the prepared free-standing double-layered hybrid solid electrolyte membrane is about 150~160 m. The membrane is compressed under a pressure condition of 500~2000 psi, at 25° C.-60° C. to make the thickness of about 100~150 m, and cut it into circular with a diameter of 18 mm. The cut membrane is also as a separator and electrolyte in the battery assembly at the same time. Finally, store the prepared double-layered hybrid solid electrolyte membrane in a glove box filled with argon gas to prevent from exposing to the outside environment with moisture and air.

Example 4

Preparing the free-standing triple-layered hybrid solid electrolyte (Tri-HSE) membrane:

One embodiment to prepare the free-standing triple-layered hybrid solid electrolyte membrane, i.e. triple-layered Li-NAFION®@Ga—F-LLZO@PVDF+PAN/LiTFSI/SN//Li-NAFION®@Ga—F-LLZO@PVDF+PAN/LiTFSI/SN//Li-NAFION®@MWCNT@PVDF+PAN/LiTFSI/SN membrane, is shown as follow:

The free-standing triple-layered hybrid solid electrolyte membrane with lithium ionic conductivity is composed of polyvinylidene fluoride (PVDF) polymer, polyacrylonitrile (PAN) polymer, bis(trifluoromethanesulfonyl) imide (LiTFSI) lithium salt, succinonitrile (SN) plasticizer, multiwall carbon nanotube carbon-based material coated with lithium-Nafion (Li-NAFION®) coating material (i.e. Li-NAFION®@MWCNT, used for isolation and inhibition the lithium-dendrite formation), and ion-doped Ga—F-LLZO all-solid-state lithium-ion conductive material coated with Li-NAFION® coating material (i.e. Li-NAFION®@Ga—F-LLZO). The following three solutions, solution A, B and C, are prepared for the preparation of the membrane.

Step (1) solution A: Dissolve PVDF in dimethylformamide (DMF) solvent, add LiTFSI (the ratio of LiTFSI to PVDF and PAN is 1:1, wt. %), mix and stir at 65° C. for 4 hours to prepare a homogeneous solution (solution A). Add PAN (PAN:PVDF=1:9, wt. %), SN (SN: PVDF and PAN=1:9, wt. %) and 1 wt. % Li-NAFION® coating material @MWCNT (comparing to PVDF+LiTFSI+PAN+SN) into the homogeneous solution A, and stir the solution at 65° C. for 6 hours. Subsequently, coat the mixture solution on a glass substrate, and place the glass substrate in a vacuum oven at room temperature to dry and remove part of the solvent. The first layer is therefore prepared (glass side).

Step (2) solution B: The preparation of solution B is similar to Step (1) in Example 3, but the ion-doped Ga—F-LLZO all-solid-state lithium-ion conductive material is replaced with 1 wt. % Li-NAFION® coating material (comparing to Ga—F-LLZO)@Ga—F-LLZO. Subsequently, coat solution B on the first layer, which is formed by solution A dried at room temperature (i.e. the second layer, the sandwiched layer).

Step (3) Solution C: The preparation of solution C is similar to Step (2) in Example 3, but Ga—F-LLZO is replaced with 1 wt. % Li-NAFION®@Ga—F-LLZO, and the ratio of LiTFSI to PVDF and PAN is higher to 1:1 (wt. %). Coat solution C on the two layers, which are formed by the solutions A and B dried at room temperature, to form a third layer (airside). Dry it at 60° C. for 48 hours. Place the triple-layered hybrid solid electrolyte membrane in a vacuum oven for drying at 70° C. for 24 hours to remove the residual solvent.

The thickness of the prepared free-standing triple-layered hybrid solid electrolyte membrane is about 210~220 m. The membrane is compressed under a pressure condition of 500~2000 psi, at 25° C.-60° C. to make a thickness of about 150~200 m, and cut it into circular with a diameter of 18 mm. The cut membrane is also as a separator and electrolyte in the battery assembly at the same time. Finally, store the prepared triple-layered hybrid solid electrolyte membrane in a glove box filled with argon gas to prevent it from exposing to the outside environment with moisture and air.

Example 5

Preparing the coin-type all-solid-state lithium battery:

The cathode separately uses $LiNi_{0.5}Co_{0.2}Mn_{0.3}O_2$ (named as NCM523), $LiNi_{0.6}Co_{0.2}Mn_{0.2}O_2$(NCM622), $LiNi_{0.5}Co_{0.1}Mn_{0.1}O_2$(NCM811), or $LiFePO_4$ (LFP) as an active material, which is dispersed and mixed with Super P conductive carbon black (conductive agent) and PVDF (binder) in N-Methyl-2-Pyrrolidone (NMP) solvent to prepare the slurry of the cathode. After stirring and mixing the slurry, the mixed slurry is coated on the aluminum foil or carbon-coated aluminum foil (i.e., current collector). Place the coated material in an oven to dry at 60° C. for 12 hours to remove the NMP solvent, and dry at 120° C. for 1 hour in an oven to remove the water or moisture. Cut the dried electrodes into circular discs with a diameter of 1.3 cm and an area of about 1.33 $cm^2$.

Assemble the dried cathode (working electrode) to get the CR2032 coin-typed battery in a glove box filled with argon gas (1TS100-1, German MBRAUN UniLab-B, $H_2O$ and $O_2$<0.5 ppm). Use the lithium metal foil as the anode (counter electrode and reference electrode) of the battery. The hybrid solid electrolyte membrane prepared in Example 3 or 4 is used as a separator and electrolyte at the same time. Besides, in the present invention, the assembled battery is defined as "cathode/electrolyte membrane/anode". For example, when using NCM523 as a cathode, lithium metal foil as an anode, Bi-HSE membrane in Example 3 as the electrolyte membrane, the assembled battery is defined as "NCM523/Bi-HSE/Hi battery".

Preparing the Ga—F-LLZO pellet:
  After drying at 80° C. in an oven, weigh 0.45 g Ga—F-LLZO powders and sieve with a mesh (Mesh #325). Compress the powders into the Ga—F-LLZO pellet with a diameter of 13 mm, and thickness of about 1.0~1.2 mm at 4000 psi with a tablet machine.

Analysis of characteristics of the materials:
  Analyze the crystal structure and impurity phase of the prepared materials including metal hydroxide precursor powders, Ga—F-LLZO powders and hybrid solid electrolyte membrane with the X-ray Diffractometer (XRD, Bruker D2 PHASER, Germany, CuKα5, λ=0.1534753 nm, 30 kV, 10 mA). Analyze the surface morphology and elemental composition of the metal hydroxide precursor powders, Ga—F-LLZO powders and hybrid solid electrolyte membrane with the field emission scanning electron microscope (FE-SEM, JEOL JSM-7610F Plus, Japan) and energy-dispersive X-ray spectroscopy (EDS, Oxford X-MaxN, UK), respectively. Analyze the samples with the micro-Raman spectroscopy (Micro-Raman, InVia confocal micro Renishaw, UK). Measure the particle size and distribution of the synthesized powders with the laser diffraction particle size analyzer (LS 13320, Beckman, Coulter).

Electrochemical characterization:
  Conduct a charge-discharge cycle test on the assembled battery prepared in Example 5 in constant current mode, based on the current rate to be tested, within the cutoff voltage range at room temperature (25° C.). Besides, measure the ionic conductivity of the Ga—F-LLZO pellet, the double-layered and the triple-layered hybrid solid electrolyte membrane, with the thickness of 1.1 mm, 150 μm and 200 μm, respectively, with the electrochemical impedance spectroscope (EIS; Metrohm Autolab B. V., Netherlands). The frequency range of the EIS measurements is $10^6$~$10^{-2}$ Hz, and the voltage amplitude is 10 mV.

Characterization of the $La_3Zr_2Ga_{0.3}(OH)_{17.9}$ metal hydroxide precursor:
  As shown in FIG. 1, confirm the crystal structure of the $La_3Zr_2Ga_{0.3}(OH)_{17.9}$ metal hydroxide precursor powders with the XRD. The result shows that the XRD pattern of the powders is quite similar to the lanthanum hydroxide structure (PDF #83-2034 $La(OH)_3$) phase. Furthermore, according to the XRD patterns of other hydroxides such as $Zr(OH)_4$ and $Ga(OH)_3$ shown in literatures, the peak is similar to which of the $La_3Zr_2Ga_{0.3}(OH)_{17.9}$ metal hydroxide precursor prepared in the present invention.

Figures 2A, 2B:
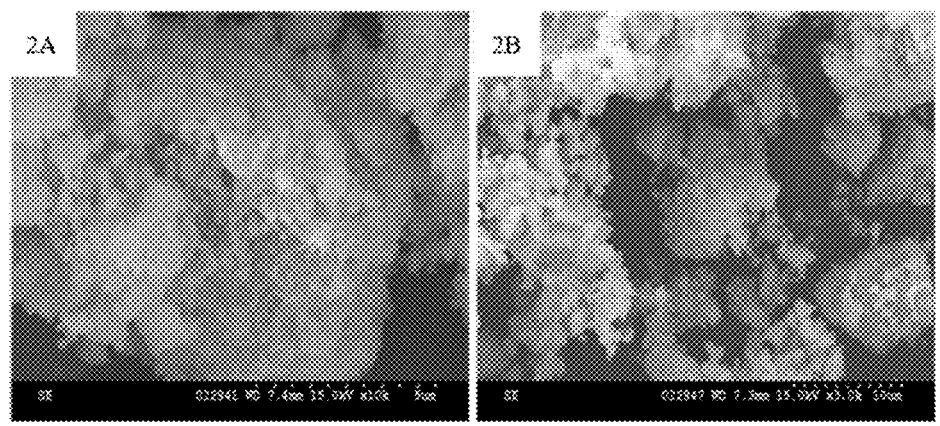
FIG. 2A shows the SEM images of the LaZrGa(OH)$_x$ metal hydroxide precursor powders and FIG. 2B shows the SEM images of Ga—F-LLZO powders.

FIG. 2A and FIG. 2B show the SEM images of the dried $La_3Zr_2Ga_{0.3}(OH)_{17.9}$ metal hydroxide precursor powders and the Ga—F-LLZO powders, respectively. Though with the TFR, quite fine particles of the $LaZrGa(OH)_x$ metal hydroxide precursor powders may be produced, the particles are easy to agglomerate to form the agglomerates with the average particle size of $d_{50}$=13 μm.

Figure 3A:
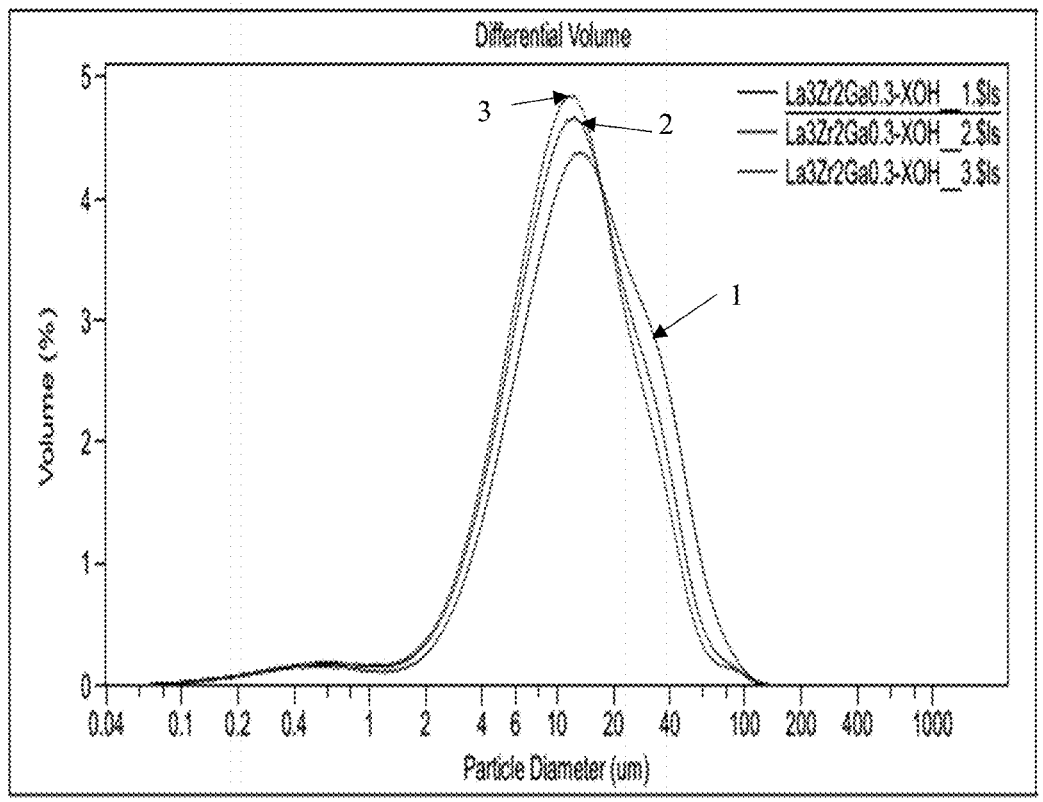
FIG. 3A shows the particle size distribution plot of the LaZrGa(OH)$_x$ metal hydroxide precursor powders prepared by a TFR.
Figure 3B:
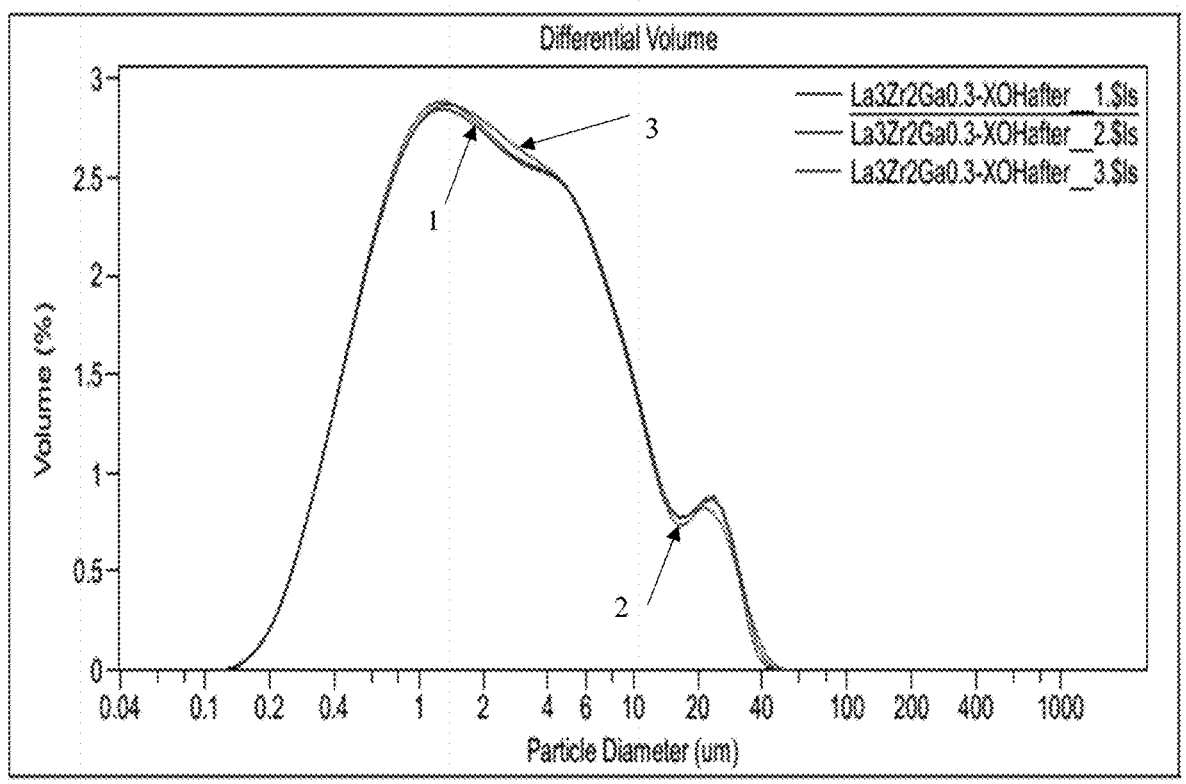
FIG. 3B shows the particle size distribution plot of the LaZrGa(OH)$_x$ metal hydroxide precursor powders, which are prepared by a TFR and followed by drying and ball milling.
Figure 3C:
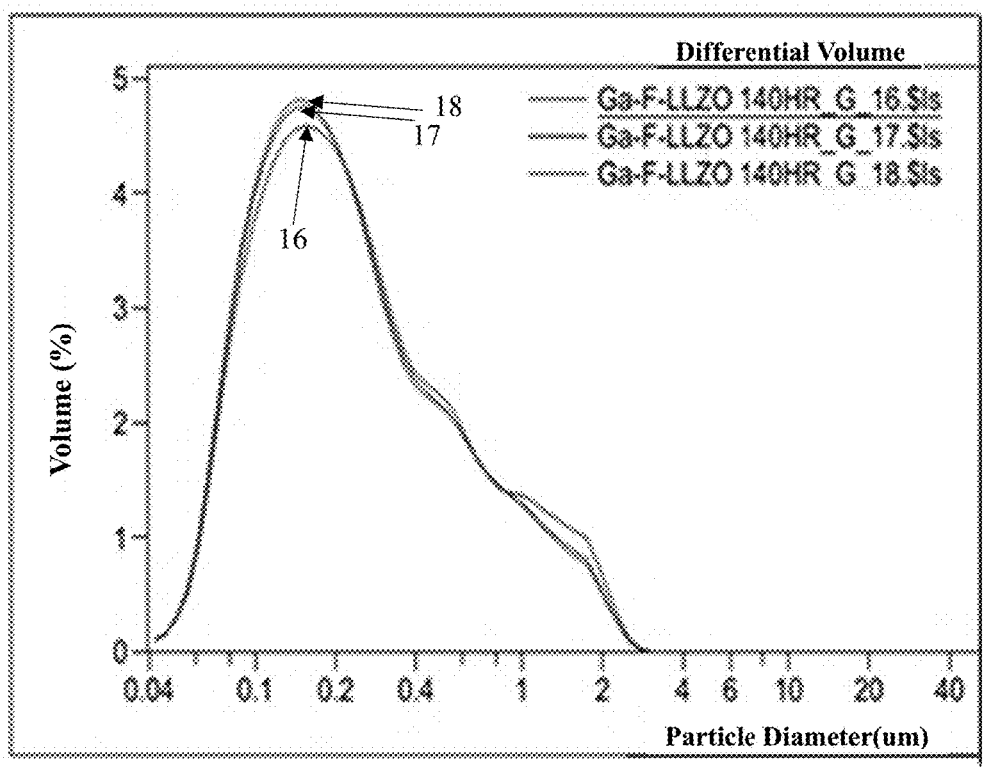
FIG. 3C shows the particle size distribution plot of the ball-milled Ga—F-LLZO powders.

Analyze the particle size distribution of the $La_3Zr_2Ga_{0.3}(OH)_{17.9}$ metal hydroxide precursor with the laser diffraction particle size analyzer. The powders are vibrated with an ultrasonicator (DC-900H, Delta Co., Taiwan) for about 30 min to disperse in the ethanol solvent before the particle size distribution measurement. As shown in FIG. 3A, $d_{10}$, $d_{50}$ and $d_{90}$ of the $La_3Zr_2Ga_{0.3}(OH)_{17.9}$ metal hydroxide precursor powders prepared with the TFR are 4.307 μm, 13.69 μm and 39.69 μm, respectively. As shown in FIG. 3B, $d_{10}$, $d_{50}$ and $d_{90}$ of the $La_3Zr_2Ga_{0.3}(OH)_{17.9}$, which is prepared with the TFR, dried at 120° C. and grinded with the circulation nano bead mill for grinding and dispersing (JUSTNANO JBM-C020, Taiwan) to decrease the particle size, are 0.519 μm, 2.165 μm and 11.37 μm, respectively. Moreover, as shown in FIG. 3C, $d_{10}$, $d_{50}$ and $d_{90}$ of the Ga—F-LLZO grinded with a ball mill are 0.089 μm, 0.213 μm and 0.956 μm, respectively.

Figure 4A:
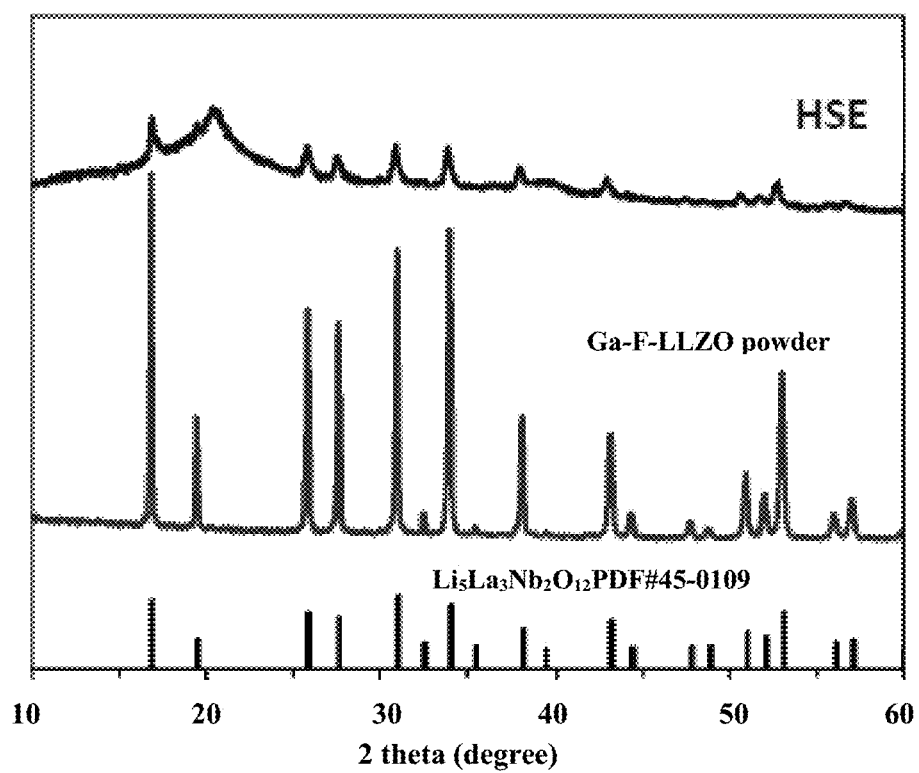
FIG. 4A shows the XRD pattern of the Ga—F-LLZO powders and the HSE membrane.

As shown in FIG. 4A, measure the crystal structure of the Ga—F-LLZO powders with the XRD. The XRD pattern of the Ga—F-LLZO powders and the LLNO (PDF #45-0109) as shown in the literature both show a typical cubic structure. Similarly, the hybrid solid electrolyte (HSE) membrane also shows the diffraction peak of the composition of the Ga—F-LLZO all-solid-state lithium-ion conductive material.

Figure 4B:
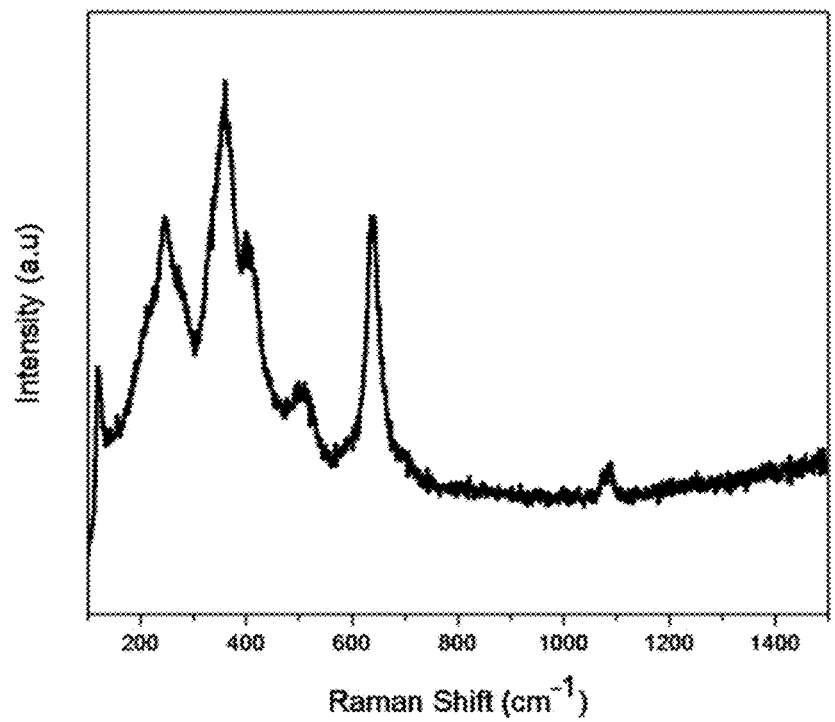
FIG. 4B shows the micro-Raman spectroscopy pattern of the Ga—F-LLZO powders.

The phase information of the LLZO material with conductive lithium ions with a garnet structure may be obtained from the micro-Raman spectroscopy analysis. As shown in FIG. 4B, the micro-Raman spectrum of the powders may show good consistency with the cubic LLZO stabilized with different cations, namely the shown cubic garnet structure is consistent with the XRD pattern shown in FIG. 4A. Moreover, exposed to humid air contributes to the $Li_2CO_3$ impurities (around 1100 $cm^{-1}$) formed on the surface of the Ga—F-LLZO. Also, the lithium carbonate is insulating and would therefore affect the lithium ionic conductivity of the LLZO powders.

Figure 5A:
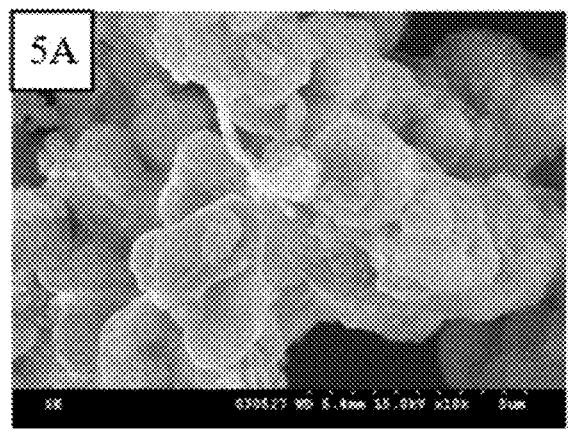
FIG. 5A and FIG. 5B show the SEM images of the Ga—F-LLZO all-solid-state lithium-ion conductive material powders coated with Li-NAFION® coating material.
Figure 5B:
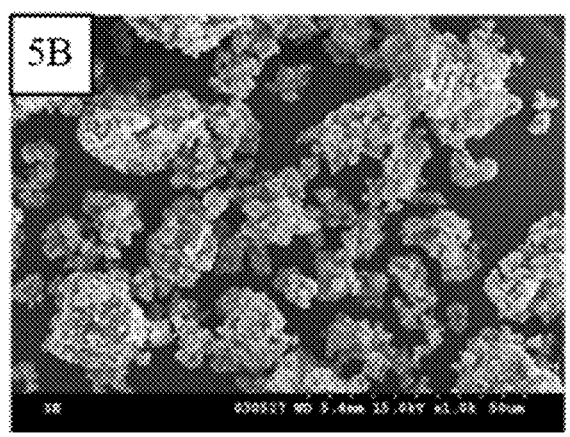
Figure 5C:
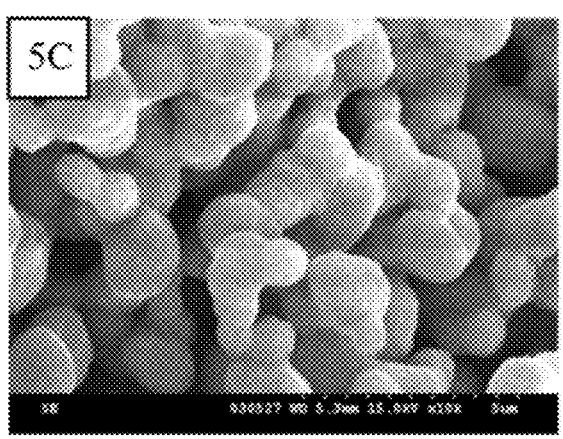
FIG. 5C and FIG. 5D show the SEM images of the Ga—F-LLZO powders without coating.
Figure 5D:
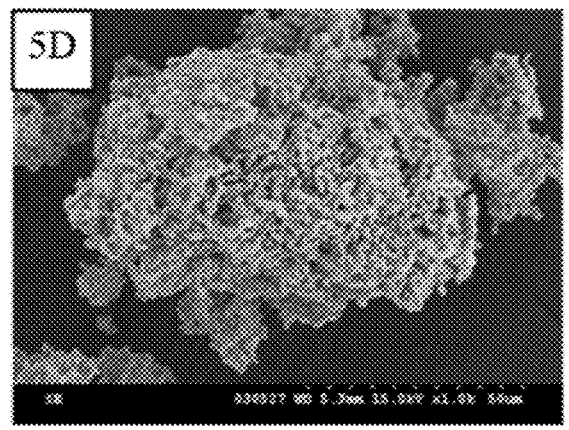

Characterization of the ion-doped Ga—F-LLZO all-solid-state lithium-ion conductive material:
  Surface morphology and microstructure:
    The SEM images of the dried $La_3Zr_2Ga_{0.3}(OH)_{17.9}$ metal hydroxide precursor powders and the Ga—F-LLZO powders are shown in FIG. 5A to FIG. 5D. Though with the TFR, quite fine particles of the $La_3Zr_2Ga_{0.3}(OH)_{17.9}$ metal hydroxide precursor powders may be produced, the particles are easy to agglomerate to form larger particles with the average particle size of $d_{50}$=13 μm. However, after calcining and ball milling, the particle size of the Ga—F-LLZO powders has apparently decreased with the diameter mainly falling within 1~3 μm (as shown in FIG. 5A and FIG. 5B). Moreover, FIG. 5A and FIG. 5B show the Ga—F-LLZO powders coated with the Li-NAFION® coating material, while FIG. 5C and FIG. 5D show the original powders without coating. Fewer agglomeration is achieved by the particles coated with the Li-NAFION® coating material compared with the original particles (FIG. 5B vs. FIG. 5D). Therefore, mix the powders coated with Li-NAFION® into the polymer base material during the preparation of the hybrid solid electrolyte membrane to achieve a better and more homogeneous dispersion than the original powders without coating.

Figure 6:
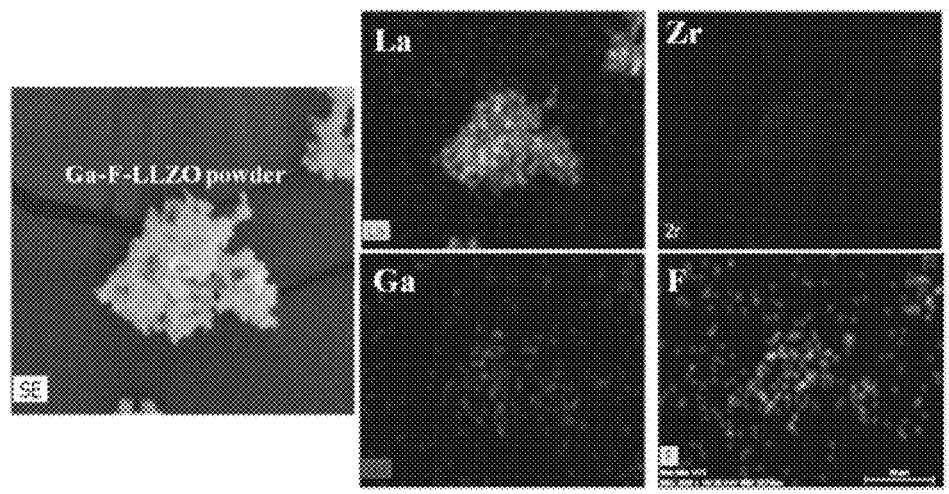
FIG. 6 shows the energy dispersive spectroscopy mapping of the Ga—F-LLZO all-solid-state lithium-ion conductive material powders.

FIG. 6 shows the energy dispersive spectroscopy mapping of the Ga—F-LLZO powders. As shown in FIG. 6, La, Zr and the doped Ga and F elements included in the ion-doped Ga—F-LLZO all-solid-state lithium-ion conductive material are all shown on the synthesized powder particles, which confirms the composition of the prepared Ga—F-LLZO.

Figure 7:
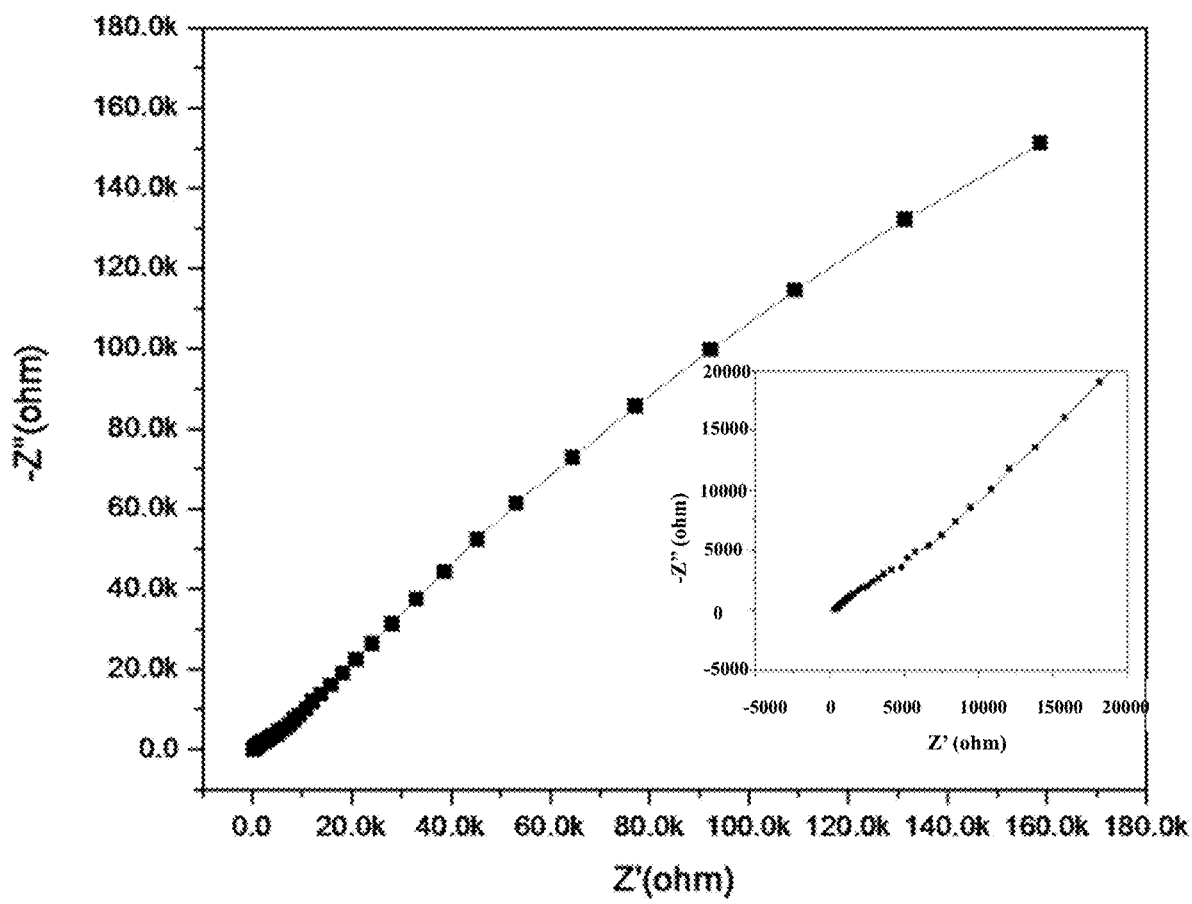
FIG. 7 shows the Nyquist plot of the compressed Ga—F-LLZO all-solid-state lithium-ion conductive material pellet.

Lithium ionic conductivity:

After drying at 80° C., weigh 0.45 g Ga—F-LLZO powders and sieve with a mesh (Mesh #325), and compress the powders into a pellet with a diameter of 13 mm and thickness of 1.1 mm at 4000 psi. Measure the ionic conductivity of the Ga—F-LLZO pellet with electrochemical impedance spectroscopy (EIS), as shown in FIG. 7. The evaluated value is $\sigma_b=2.50\times10^{-4}$ S cm$^{-1}$. The lithium ionic conductivity of the Ga—F-LLZO all-solid-state lithium-ion conductive material pellet is shown in Table 2.

TABLE 2

| Sample | Thickness (mm) | Area (cm$^2$) | Impedence $R_b$ ($\Omega$) | Ionic Conductivity $\sigma_b$ (S cm$^{-1}$) |
|---|---|---|---|---|
| Ga-F-LLZO pellet | 1.1 | 1.33 | 337.2 | $2.50 \times 10^{-4}$ |

Figure 8A:
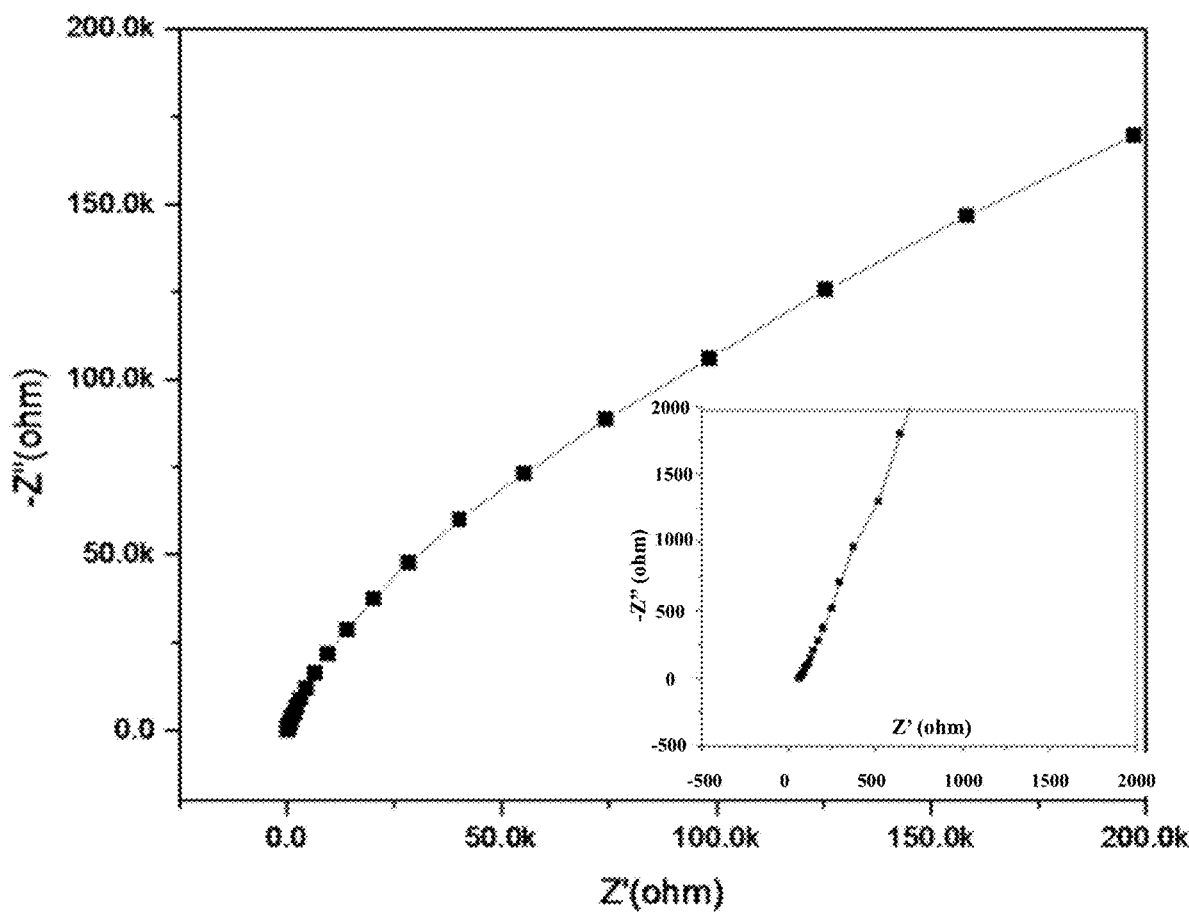
FIG. 8A shows the Nyquist plots of the double-layered HSE membrane and FIG. 8B shows the Nyquist plots of the triple-layered HSE membrane.
Figure 8B:
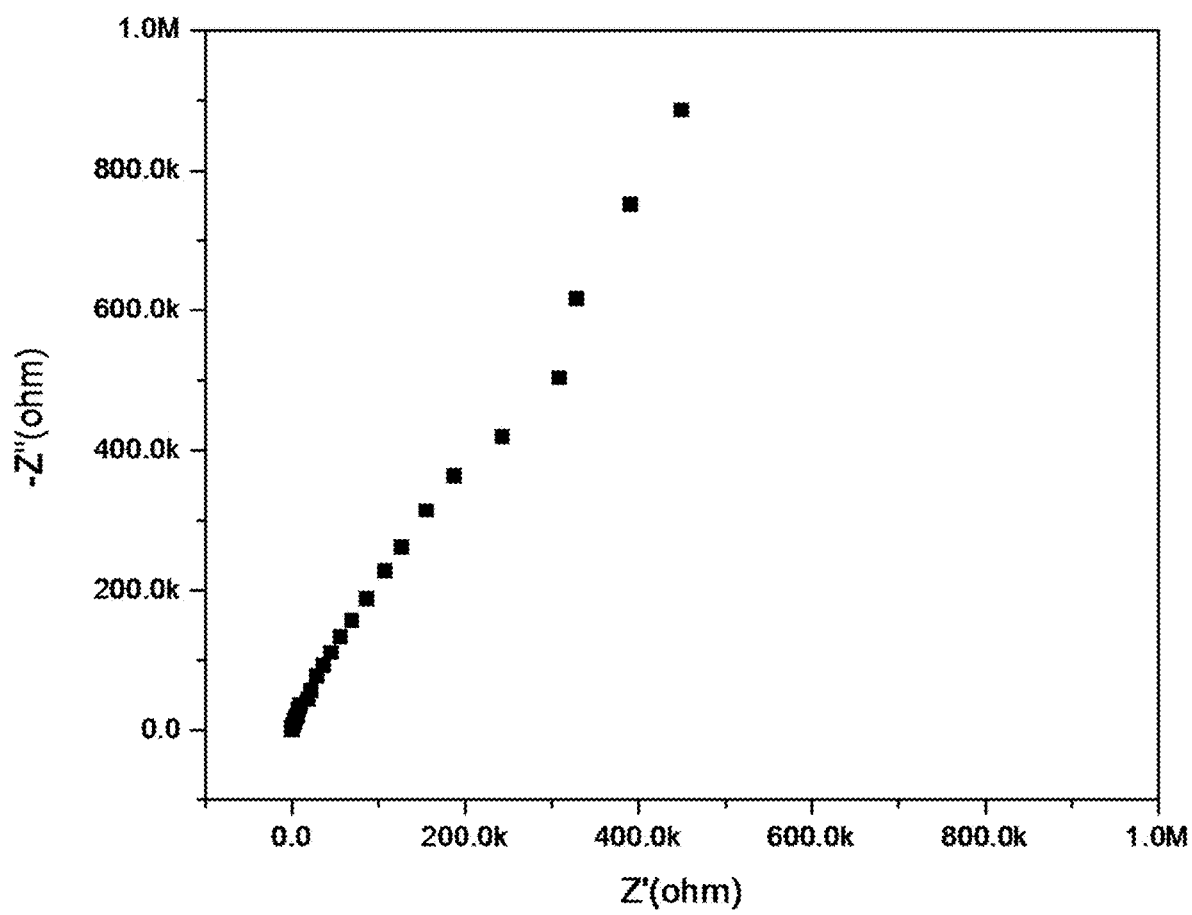

Double-layered and triple-layered hybrid solid electrolyte membranes:

Lithium ionic conductivity:

As shown in FIG. 8A to FIG. 8B, measure the ionic conductivity of the prepared double-layered (as shown in FIG. 8A) and the triple-layered hybrid solid electrolyte membrane (as shown in FIG. 8B). The result shows that the values are $\sigma_b=2.67\times10^{-4}$ and $4.45\times10^{-4}$ S cm$^{-1}$ (the thickness of the membrane are 150 and 200 μm), respectively. The data is shown in Table 3.

TABLE 3

| Sample | Thickness (mm) | Area (cm$^2$) | Impedence $R_b$ ($\Omega$) | Ionic Conductivity $\sigma_b$ (S cm$^{-1}$) |
|---|---|---|---|---|
| Double layered HSE membrane | 0.015 | 1.33 | 43.2 | $2.67 \times 10^{-4}$ |
| Triple layered HSE membrane | 0.020 | 1.33 | 36.3 | $4.45 \times 10^{-4}$ |

Figure 9A:
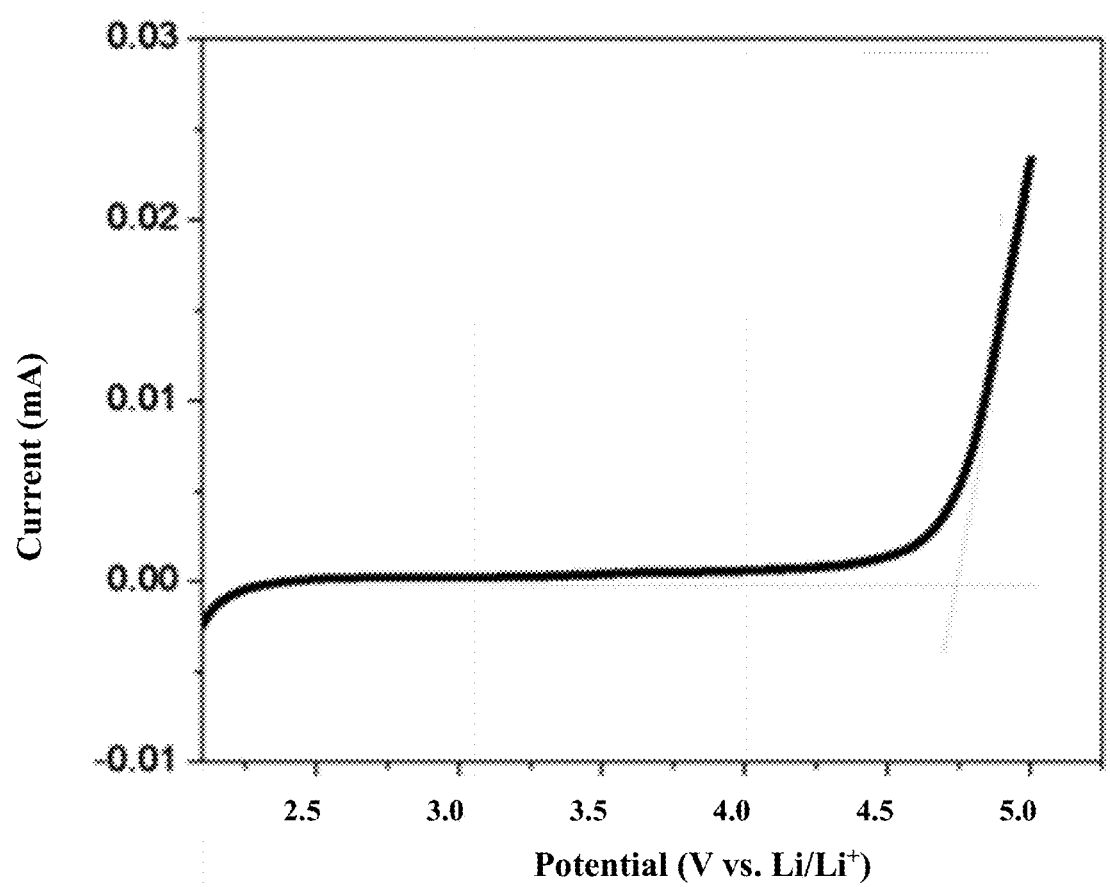
FIG. 9A shows the electrochemical stabilization window plots measuring by the LSV of the double-layered HSE membrane and FIG. 9B shows the electrochemical stabilization window plots measuring by the LSV of the triple-layered HSE membrane.
Figure 9B:
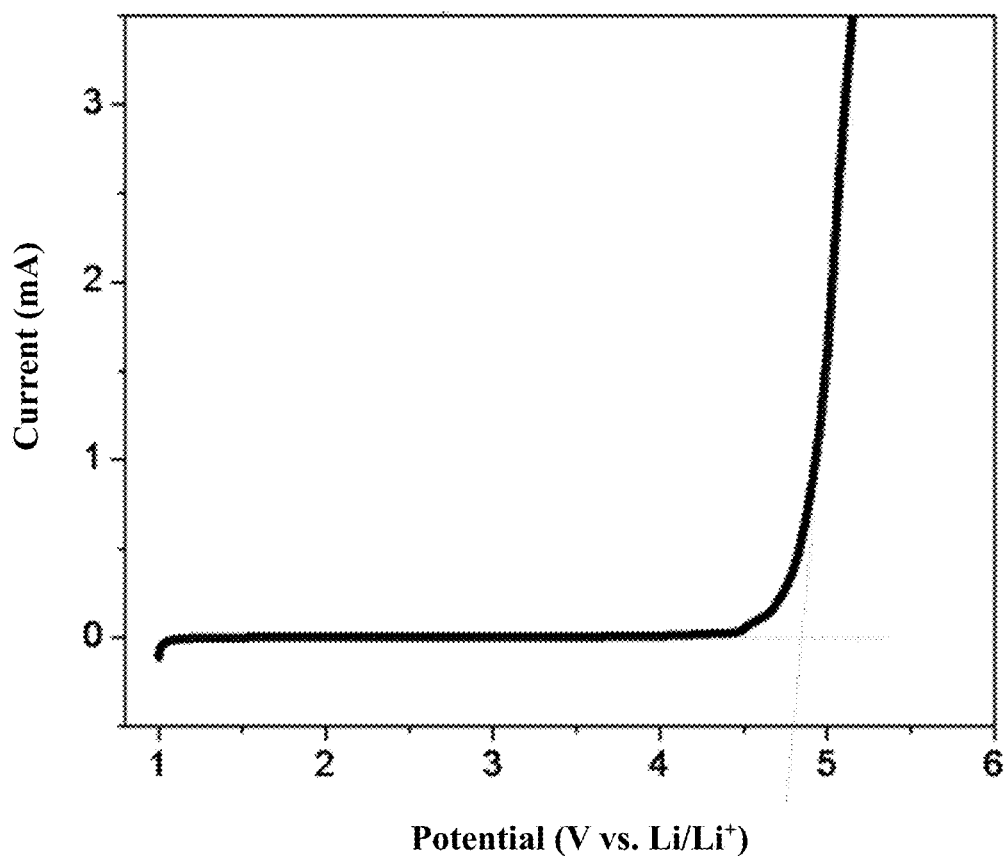

Electrochemical stability:

Since an electrochemical window is related to the energy density and working voltage of a battery, a wider electrochemical window plays an important role in the electrochemical reaction of a lithium battery. Measure the electrochemical stability of the double-layered hybrid solid electrolyte (Bi-HSE) membrane and triple-layered hybrid solid electrolyte (Tri-HSE) membrane by linear sweep voltammetry (LSV). As shown in FIG. 9A, Bi-HSE membrane starts to decompose at around 4.75 V. At the same time, Tri-HSE membrane, which includes more lithium salts, starts to decompose at around 4.86 V (FIG. 9B). Therefore, the prepared two types of hybrid solid electrolyte membranes are both quite suitable to serve as a cathode material of the NCM series with high voltage (≥4.3 V), such as the aforementioned NCM523, NCM622 and NCM811, etc.

Figures 10A, 10B:
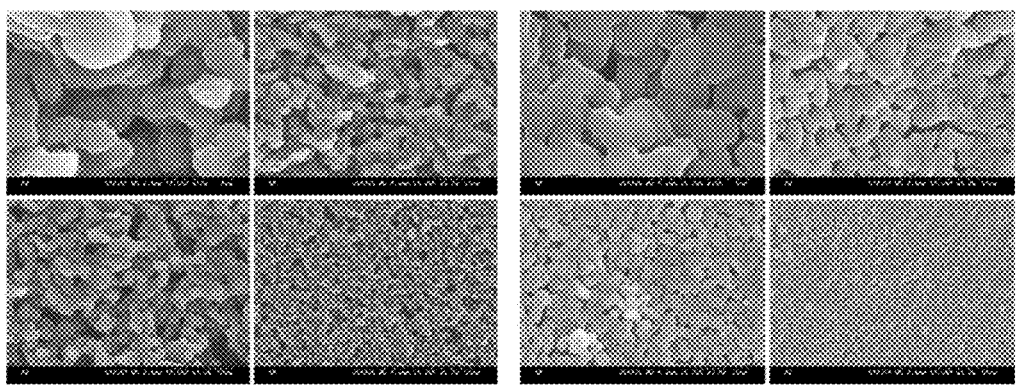
FIG. 10A shows the SEM images of the top (air side) of the double-layered HSE membrane and FIG. 10B shows the SEM images of the bottom (glass side) of the double-layered HSE membrane.

Surface morphology and microstructure:

FIG. 10A to FIG. 10B and FIG. 11A to FIG. 11C show SEM images of the double-layered and triple-layered hybrid electrolyte membranes, respectively. FIG. 10A shows the SEM images of the top (air side) of the double-layered HSE membrane and FIG. 10B shows the SEM images of the bottom (glass side) of the double-layered HSE membrane. And the SEM images of the top (air side), middle (sandwiched layer) and bottom (glass side) of the triple-layered HSE membrane are shown in FIG. 11A, FIG. 11B and FIG. 11C, respectively. The SEM images show that the Ga—F-LLZO all-solid-state lithium-ion conductive material powders may disperse in the polymer base material evenly, and the even distribution of the lithium-ion conductive material powder particles would be advantageous to improve the electrochemical properties.

Electrochemical performance of the all-solid-state lithium battery (double-layered hybrid solid electrolyte membrane):

Conduct the electrical tests on the all-solid-state lithium battery using the HSE membrane in Example 3 to confirm the properties of the hybrid electrolyte membrane in the all-solid-state battery.

Figure 12B:
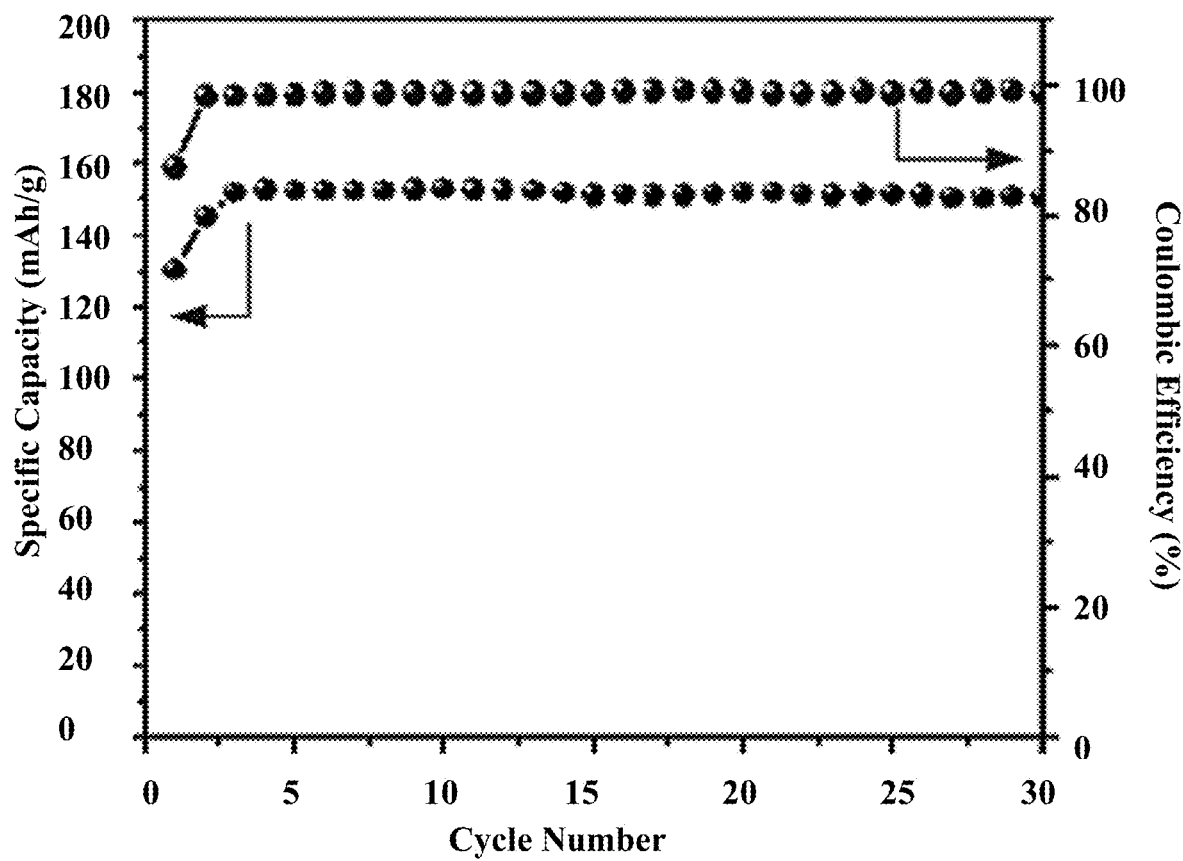
FIG. 12B shows the performance plot of the all-solid-state NCM523/Bi-HSE/Li battery cycled at a rate of 0.2 C for 30 cycles.

NCM523/Bi-HSE/Li battery:

Use the double-layered HSE membrane, the NCM523 with 65% active materials as the cathode, and the lithium metal foil as the anode, to conduct a charge-discharge cycle test at room temperature, with the rate of 0.2 C and the cutoff voltage of 2.5~4.2 V for 30 cycles. FIG. 12A shows the charge-discharge curve of the all-solid-state NCM523/Bi-HSE/Li battery, and FIG. 12B shows the performance plot of the all-solid-state NCM523/Bi-HSE/Li battery cycled at a rate of 0.2 C for 30 cycles. As shown, the first discharge specific capacity ($Q_{sp}$) is 130.4 mAh g$^{-1}$. However, after 30 cycles, the discharge specific capacity has enhanced to 150.6 mAh g$^{-1}$. The capacity retention rate is calculated to be about 98.4%. Furthermore, the average Coulombic efficiency (CE) is 99.1%.

Figure 13A:
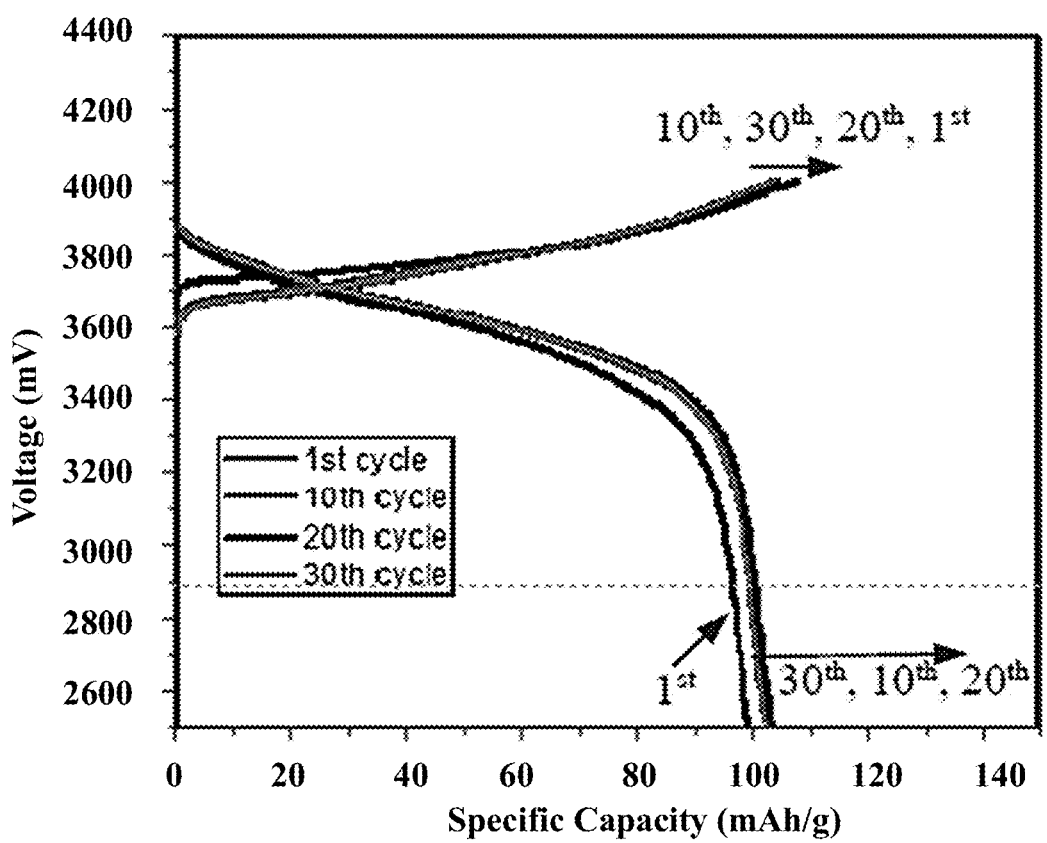
FIG. 13A shows the charge-discharge curve of the all-solid-state NCM811/Bi-HSE/Li battery.
Figure 13B:
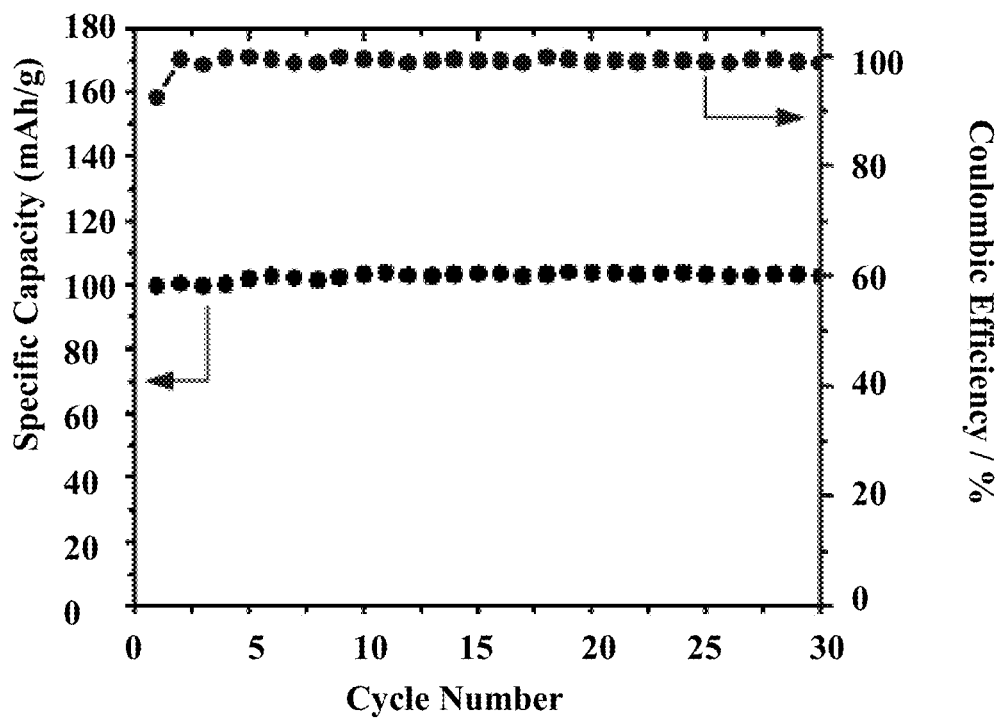
FIG. 13B shows the performance plot of the all-solid-state NCM811/Bi-HSE/Li battery cycled at a rate of 0.5 C for 30 cycles.

NCM811/Bi-HSE/Li battery:

Use the double-layered HSE membrane, the NCM811 with 65% active materials as the cathode, and the lithium metal foil as the anode, to conduct a charge-discharge cycle test at room temperature, with the rate of 0.5 C and the cutoff voltage of 2.5~4.0 V for 30 cycles. FIG. 13A shows the charge-discharge curve of the all-solid-state NCM811/Bi-HSE/Li battery, and FIG. 13B shows the performance plot of the all-solid-state NCM811/Bi-HSE/Li battery cycled at a rate of 0.5 C for 30 cycles. As shown, the first discharge specific capacity ($Q_{sp}$) is 99.5 mAh g$^{-1}$. However, after 30 cycles, the discharge specific capacity has enhanced to 102.8 mAh g$^{-1}$. The capacity retention rate is calculated to be about 99.0%. Furthermore, the average Coulombic efficiency (CE) is 99.0%.

Figure 14:
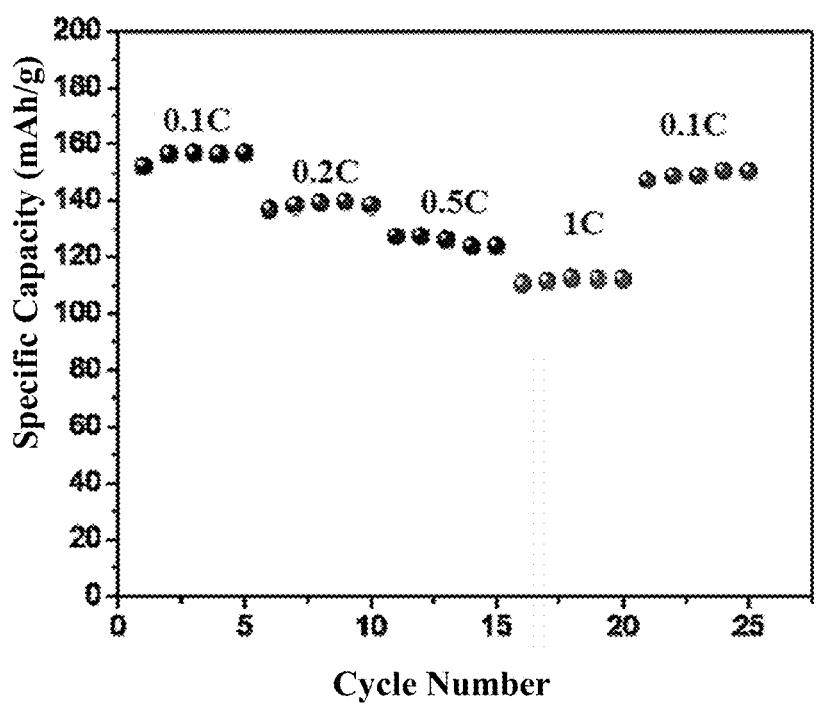
FIG. 14 shows the rate characteristics (0.1 C to 1 C) of the all-solid-state NCM811/Bi-HSE/Li battery.

FIG. 14 shows the different charge-discharge rate characteristics of the assembled lithium battery with the double-layered HSE membrane at different current rates (0.1~1 C). The first discharge specific capacities at 0.1, 0.2, 0.5, 1 and 0.1 C are 153, 137, 128, 112 and back to 147 mAh g$^{-1}$.

Electrochemical performance of the all-solid-state lithium battery (triple-layered hybrid solid electrolyte membrane):

Conduct the electrical tests on the all-solid-state lithium battery using the HSE membrane in Example 4 to confirm the properties of the hybrid electrolyte membrane in the all-solid-state battery.

Figure 15A:
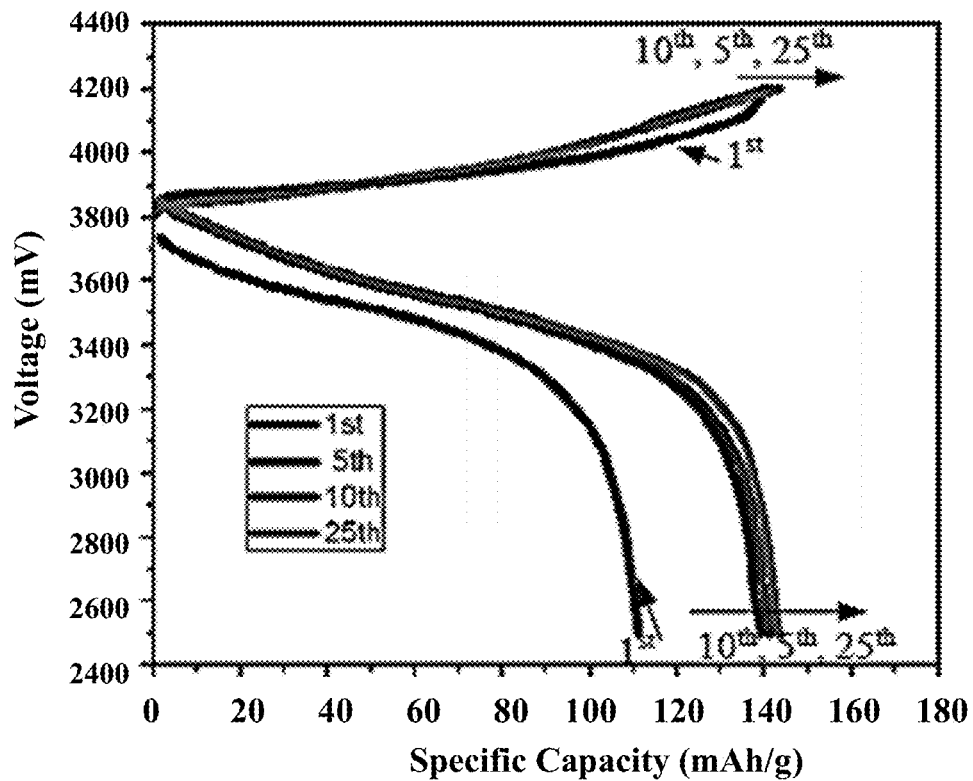
FIG. 15A shows the charge-discharge curve of the all-solid-state NCM811/Tri-HSE/Li battery.
Figure 15B:
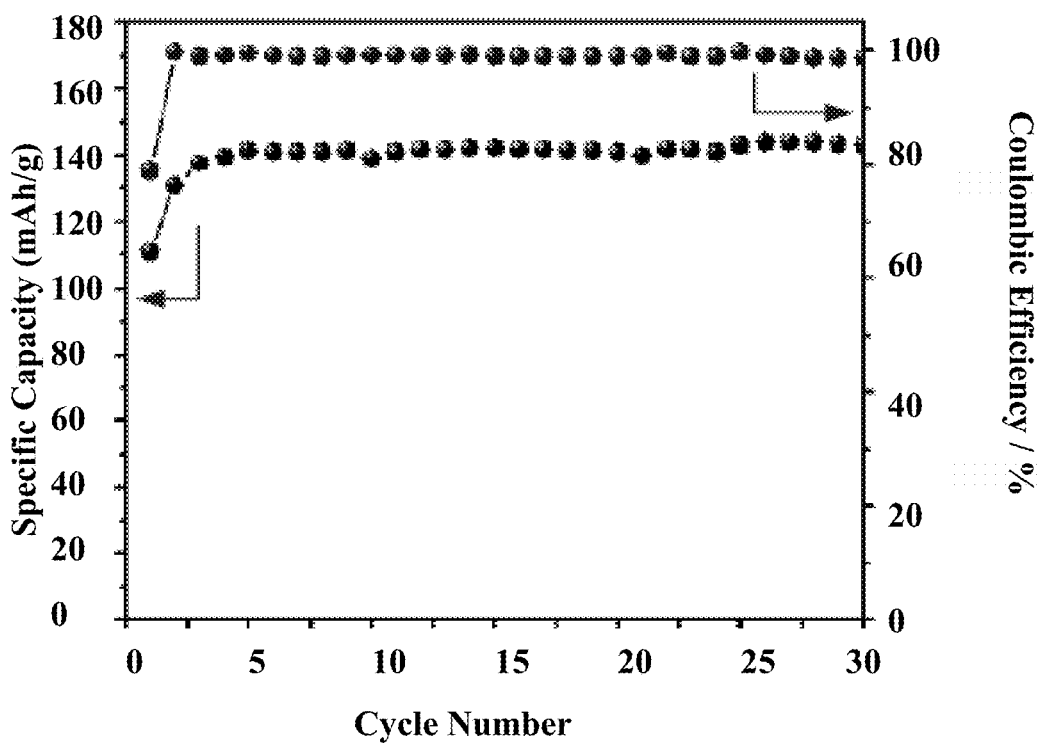
FIG. 15B shows the performance plot of the all-solid-state NCM811/Tri-HSE/Li battery cycled at a rate of 0.5 C for 30 cycles.

NCM811/Tri-HSE/Li battery:

Use the triple-layered HSE membrane, the NCM811 with 65% active materials as the cathode, and the lithium metal foil as the anode, to conduct a charge-discharge cycle test at room temperature, with the rate of 0.5 C and the cutoff voltage of 2.5~4.2 V for 30 cycles. The result is shown in FIG. 15A to FIG. 15B. The first discharge specific capacity ($Q_{sp}$) is 110.95 mAh g$^{-1}$. However, after 30 cycles, the discharge specific capacity has enhanced to 142.98 mAh g$^{-1}$. The capacity retention rate is calculated to be about 99.4%. Furthermore, the average Coulombic efficiency (CE) is 98.5%.

Figure 16:
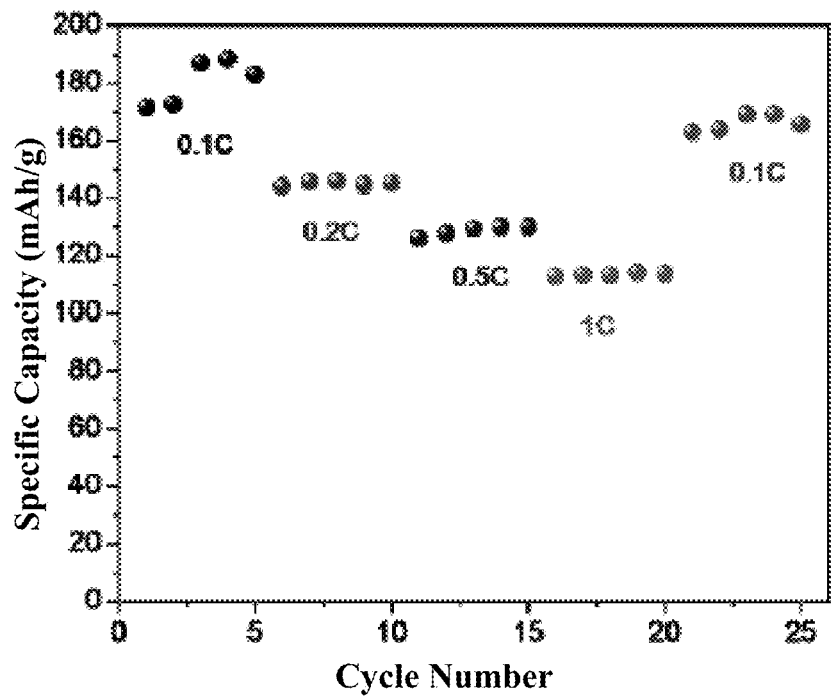
FIG. 16 shows the rate characteristics (0.1 C to 1 C) of the all-solid-state NCM811/Tri-HSE/Li battery.

FIG. 16 shows the different charge-discharge rate characteristics of the assembled lithium battery with the triple-layered HSE membrane at different current rates (0.1~1 C). The first discharge specific capacities at 0.1, 0.2, 0.5, 1 and 0.1 C are 171, 144, 126, 113 and back to 163 mAh g$^{-1}$.

Figure 17A:
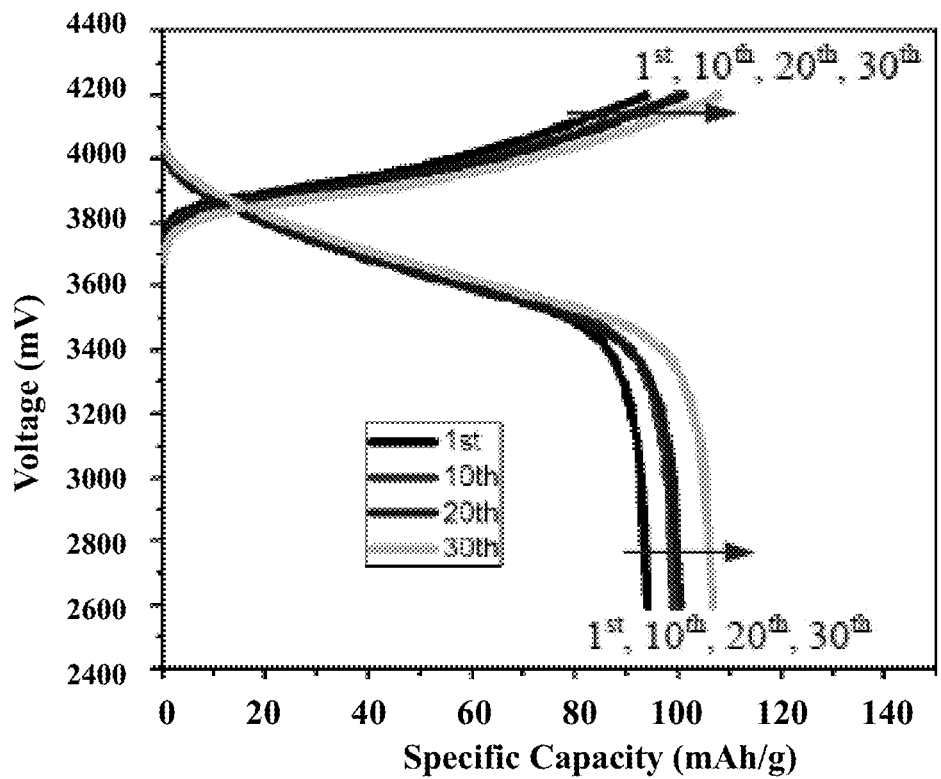
FIG. 17A shows the charge-discharge curve of the all-solid-state NCM622/Tri-HSE/Li battery.
Figure 17B:
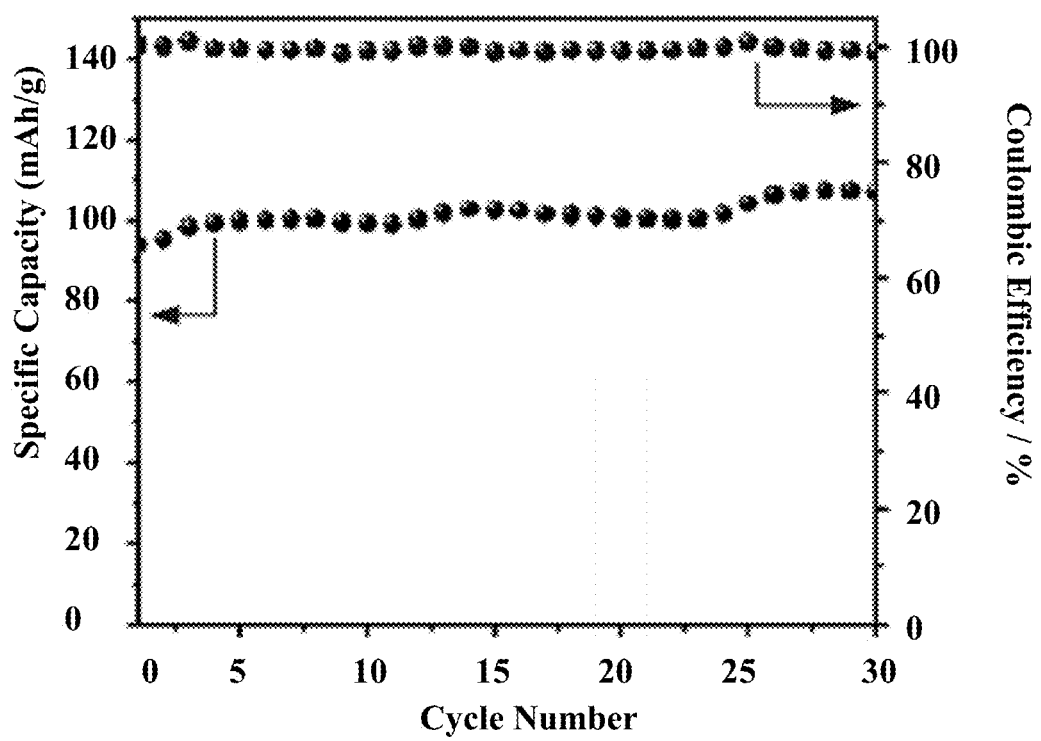
FIG. 17B shows the performance plot of the all-solid-state NCM622/Tri-HSE/Li battery cycled at a rate of 0.5 C for 30 cycles.

NCM622/Tri-HSE/Li battery:

Use the triple-layered HSE membrane, the NCM622 with 70% active materials as the cathode, and the lithium metal foil as the anode, to conduct a charge-discharge cycle test at room temperature, with the rate of 0.5 C and the cutoff voltage of 2.6~4.2 V for 30 cycles. The result is shown in FIG. 17A to FIG. 17B. The first discharge specific capacity ($Q_{sp}$) is 94.0 mAh g$^{-1}$. However, after 30 cycles, the discharge specific capacity has enhanced to 107.2 mAh g$^{-1}$. The capacity retention rate is calculated to be about 99.8%. Furthermore, the average Coulombic efficiency (CE) is 99.7%.

Figure 18:
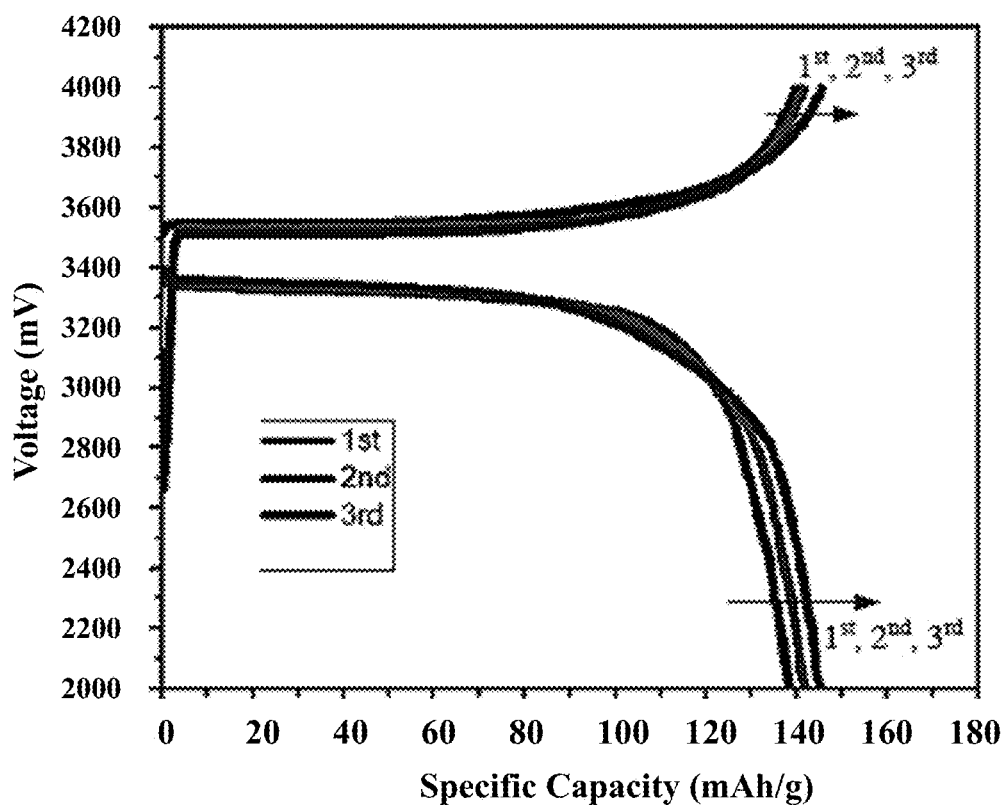
FIG. 18 shows the charge-discharge curve of the all-solid-state LFP/Tri-HSE/Li battery cycled at a rate of 0.2 C for 3 cycles.

LFP/Tri-HSE/Li battery:

Use the triple-layered HSE membrane, the LiFePO$_4$ with 80% active materials as the cathode, and the lithium metal foil as the anode, to conduct a charge-discharge cycle test at room temperature, with the rate of 0.2 C and the cutoff voltage of 2.0~4.0 V for 3 cycles. The result is shown in FIG. 18. The first discharge specific capacity ($Q_{sp}$) is 138.3 mAh g$^{-1}$. However, after 3 cycles, the discharge specific capacity has enhanced to 145.1 mAh g$^{-1}$. The capacity retention rate is calculated to be about 100%. Furthermore, the average Coulombic efficiency (CE) is 99.6%.

To summarize, the all-solid-state lithium battery of the present invention may enhance the lithium ionic conductivity with an increased lithium-ion transport pathways, and lower the interfacial resistance between the hybrid solid electrolyte membrane and the electrodes, therefore the battery may have excellent performance, and prevent the lithium-dendrite formation to enhance the battery safety.

What is claimed is:

1. A method for the fabrication of a free-standing triple-layered organic-inorganic hybrid solid electrolyte membrane, comprising the steps of:
   step (1): preparing an ion-doped all-solid-state lithium-ion conductive material with lithium ionic conductivity, comprising:
   (1-a) mixing LaZrGa(OH)$_x$ metal hydroxide precursor, wherein X is 17.9, LiOH·H$_2$O serving as a lithium source, and a source of ion doping, to form a mixture; in a milling pot comprising a methanol solvent, grinding and mixing the mixture with a ball mill to form a mixture solution; after grinding, removing a milling ball from the milling pot, and placing the milling pot in an oven to dry the mixture solution, in order to remove the methanol solvent and to form a powder; wherein the source of ion doping is by at least one method selected from a group consisting of single-ion doping, dual-ion doping and multi-ion doping and an ion used for the ion doping is at least one selected from a group consisting of fluoride ion, gallium ion, aluminum ion, calcium ion, tantalum ion, strontium ion, scandium ion, barium ion, yttrium ion, tungsten ion, niobium ion, gadolinium ion and silicon ion; and wherein fabricating the LaZrGa(OH)$_x$ metal hydroxide precursor comprises the steps of:
   (a) dissolving a metal salt powder separately serving as a lanthanum source, a zirconium source and a gallium source, in deionized water to form a metal salt solution 1; wherein the metal salt powder is optionally adjusted according to a corresponding stoichiometric composition during a synthesis;
   (b) adding sodium hydroxide to create an alkaline region and as a precipitation agent solution, ammonia water serving as a chelating agent, and the metal salt solution 1 prepared in step (a) into a reaction chamber of a continuous Taylor flow reactor, maintaining a pH value in the reaction chamber with a pH value control system, to conduct a continuous production with a co-precipitation method; wherein an amount of the precipitation agent and the chelating agent are each optionally adjusted according to a stoichiometric composition of different hydroxide precursors, to cause a reaction and obtain a precipitate;
   (c) after the reaction, filtering the precipitate prepared in step (b) and washing the precipitate several times with ethanol and deionized water, in order to remove residual ions and obtain a filtered and washed precipitate; and
   (d) drying the filtered and washed precipitate prepared in step (c) in an oven to fabricate a dried powder of the LaZrGa(OH)$_x$ metal hydroxide precursor; and;
   (1-b) calcining the dried powder of the LaZrGa(OH)$_x$ metal hydroxide precursor prepared in step (1-a) in air or a pure oxygen atmosphere in a furnace, to obtain the ion-doped all-solid-state lithium-ion conductive material with lithium ionic conductivity; and
   step (2): preparing a free-standing triple-layered organic-inorganic hybrid solid electrolyte membrane, comprising:
   (2-a) dissolving polyvinylidene fluoride in a dimethylformamide solvent, adding a lithium salt, mixing and stirring to prepare a homogeneous solution A;
   (2-b) adding polyacrylonitrile, a plasticizer and a carbon-based material coated with a coating material into the homogeneous solution A to prepare a solution A', and then the solution A' is stirred and mixed, and then coated on a glass substrate; placing the glass substrate in a vacuum oven under room temperature to dry and remove part of the dimethylformamide solvent to obtain a first layer of a membrane; wherein,
   the carbon-based material used in step (2-b) is at least one material selected from a group consisting of single-wall carbon nanotube, multi-wall carbon nanotube, vapor-grown carbon fiber, graphene oxide, reduced graphene oxide, graphene, graphitic carbon nitride and porous carbon;
   (2-c) adding the polyacrylonitrile, the plasticizer and the all-solid-state lithium-ion conductive material coated with the coating material into the homogeneous solution A with a proportion of the all-solid-state lithium-ion conductive material coated with the coating material to the polyvinylidene fluoride and the polyacrylonitrile being 20 weight % and with a proportion of the lithium salt to the polyvinylidene fluoride and the polyacrylonitrile to prepare a solution A", and then the solution A" is stirred to prepare a solution B; coating the solution B on the first layer of the membrane prepared in step (2-b) to obtain a second layer; wherein,
   the coating material in steps (2-b) and (2-c) is at least one material selected from a group consisting of lithiated sulfonated tetrafluoroethylene based fluoropolymer-copolymer, lithiated polystyrene sulfonate, lithium fluoride, lithiated polyacrylic acid, lithium molybdate, lithium orthosilicate and porous carbon;

(2-d) repeating step (2-c) with a lower proportion of the all-solid-state lithium-ion conductive material coated with the coating material to the polyvinylidene fluoride and the polyacrylonitrile being 12.5 weight %, to prepare a solution C; coating the solution C on the second layer to obtain a triple-layered hybrid solid electrolyte membrane; placing the triple-layered hybrid solid electrolyte membrane in a vacuum oven to dry and remove residual solvent; and cutting the triple-layered hybrid solid electrolyte membrane into a circle; wherein, the lower proportion of the all-solid-state lithium-ion conductive material coated with the coating material to the polyvinylidene fluoride and the polyacrylonitrile is 25% to less than 100% of the proportion of the lithium salt to the polyvinylidene fluoride and the polyacrylonitrile in step (2-c).

2. The method of claim 1, wherein the lithium source in said step (1-a) is at least one material selected from a group consisting of lithium hydroxide, lithium nitrate, lithium acetate, lithium oxalate, lithium oxide, and lithium carbonate; a molar ratio between the $LaZrGa(OH)_x$ metal hydroxide precursor and the $LiOH \cdot H_2O$ in step (1-a) is 1:5.5-6.650; the ion in the source of ion doping is lithium fluoride (LiF) or ammonium fluoride ($NH_4F$) with a stoichiometric composition of 0.05-0.3; the grinding and mixing the mixture with the ball mill in step (1-a) is at 100-650 rpm for 10 minutes to 2 hours, and the ball in the ball mill is at least one material selected from a group consisting of a zirconia ($ZrO_2$) ball, hardened steel, yttrium stabilized zirconia (YSZ), tungsten carbide, agate, sintered alumina and silicon nitride ball; and wherein a weight ratio of the mixture to the ball in step (1-a) is 1:1-20.

3. The method of claim 1, wherein the metal salt solution 1 in step (a) has a concentration of 1.0-3 M.

4. The method of claim 1, wherein the lanthanum source in step (a) is at least one material selected from a group consisting of lanthanum sulfate, lanthanum oxalate, lanthanum acetate, lanthanum nitrate, lanthanum chloride.

5. The method of claim 1, wherein the zirconium source in step (a) is at least one material selected from a group consisting of zirconium oxychloride, zirconium sulphate, zirconium acetate, zirconium oxynitrate and zirconium chloride.

6. The method of claim 1, wherein the gallium source in step (a) is at least one material selected from a group consisting of gallium acetate, gallium sulfate and gallium nitrate.

7. The method of claim 1, wherein in step (b), the ammonia water serving as the chelating agent has a concentration of 2.0-8.0 M; the pH value in the reaction chamber of the continuous Taylor flow reactor is maintained between 10-12; a rotation rate of the continuous Taylor flow reactor is set within a range of 500-1500 rpm; and a duration time of the reaction in the continuous Taylor flow reactor is 8-80 hours.

8. The method of claim 1, wherein the drying in step (d) is at 50-100° C. for 10-30 hours.

9. The method of claim 1, wherein the calcining in step (1-b) is maintaining a temperature at 150° C. for 1 hour in a first stage, 300-400° C. for 3 hours in a second stage, 400-600° C. for 1 hour in a third stage, 500-800° C. for 4 hours in a fourth stage, and 800-1000° C. for 1-5 hours in a fifth stage; wherein the first, second, third, fourth and fifth stages are proceeded with a heating rate of 1-10° C. min$^{-1}$.

10. The method of claim 1, wherein the lithium salt in step (2-a) is at least one material selected from a group consisting of lithium bis(trifluoromethanesulfonyl)imide, lithium bis(trifluoromethanesulfonyl)azanide, lithium bis(fluorosulfonyl)imide, lithium perchlorate, lithium trifluoromethanesulfonate, lithium bis(oxalate)borate and lithium tetrafluoroborate; and the plasticizer in step (2-b) is at least one material selected from a group consisting of succinonitrile, adiponitrile, lithium azide, polyethylene glycol, poly(ethylene glycol) diacrylate and triallyl isocyanurate.

11. The method of claim 1, wherein in step (2-b), the carbon-based material is coated with the coating material with an amount of 0.05-5.0 wt. %.

12. The method of claim 1, wherein in step (2-c), the all-solid-state lithium-ion conductive material is coated with the coating material with an amount of 0.05-5.0 wt. %.

13. An all-solid-state lithium battery, comprising: a cathode, an anode, and the hybrid solid electrolyte membrane recited in claim 1; wherein the hybrid solid electrolyte membrane is disposed between the cathode and the anode, serving as a separator and an electrolyte simultaneously; the anode is a lithium metal foil; the cathode is made of a composite and a collector layer, wherein the composite comprises an active material, a conductive agent and a binder.

* * * * *